(12) United States Patent
Fujitani et al.

(10) Patent No.: US 11,657,985 B2
(45) Date of Patent: May 23, 2023

(54) OPERATION SWITCH UNIT, REMOTE OPERATION TERMINAL AND OPERATION SYSTEM

(71) Applicant: IDEC Corporation, Osaka (JP)

(72) Inventors: Shigetoshi Fujitani, Sakai (JP); Ikuo Maeda, Kawanishi (JP); Toshiyuki Kasama, Nagaokakyo (JP); Eiji Yoshi, Nishinomiya (JP)

(73) Assignee: IDEC CORPORATION, Osaka (JP)

(*) Notice: Subject to any disclaimer, the term of this patent is extended or adjusted under 35 U.S.C. 154(b) by 372 days.

(21) Appl. No.: 16/766,046

(22) PCT Filed: Nov. 27, 2018

(86) PCT No.: PCT/JP2018/043651
§ 371 (c)(1),
(2) Date: May 21, 2020

(87) PCT Pub. No.: WO2019/107376
PCT Pub. Date: Jun. 6, 2019

(65) Prior Publication Data
US 2020/0365342 A1    Nov. 19, 2020

(30) Foreign Application Priority Data

Nov. 28, 2017  (JP) ............................. JP2017-228191
Aug. 1, 2018   (JP) ............................. JP2018-145471
(Continued)

(51) Int. Cl.
*H01H 3/28*    (2006.01)
*H01H 1/50*    (2006.01)
(Continued)

(52) U.S. Cl.
CPC ............... *H01H 3/28* (2013.01); *H01H 1/50* (2013.01); *H01H 3/022* (2013.01); *H01H 3/12* (2013.01);
(Continued)

(58) Field of Classification Search
CPC ........... H01H 3/022; H01H 3/12; H01H 3/28; H01H 1/20; H01H 9/0066;
(Continued)

(56) References Cited

U.S. PATENT DOCUMENTS 6,288,352 B1   9/2001  Fukui et al.
6,330,175 B2   12/2001 Shirato et al.
(Continued)

FOREIGN PATENT DOCUMENTS

JP   2001-023472 A   1/2001
JP   2001-035302 A   2/2001
(Continued)

OTHER PUBLICATIONS

English translation of the International Search Report of the International Searching Authority for International Application PCT/JP2018/043651, dated Feb. 5, 2019, 2 pages, Japanese Patent Office, Tokyo, Japan.

(Continued)

*Primary Examiner* — Orlando Bousono
(74) *Attorney, Agent, or Firm* — Cantor Colburn LLP

(57) ABSTRACT

The emergency stop switch unit 2 as an operation switch unit includes a direct operation part 20A and an alternative operation part 20B. The direct operation part 20A has an emergency stop button 21 adapted to be directly operated. The alternative operation part 20B is adapted to be linked with the direct operation part 20A and alternatively operates the emergency stop button 21 in place of the direct operation part 20A. The alternative operation part 20B has a reception (Continued)

part 32 that detects a remote operation of the emergency stop button 21 and an electromagnetic solenoid 3 that actuates the emergency stop button 21 on the basis of the remote operation detected by the reception part 32.

12 Claims, 27 Drawing Sheets

(30) Foreign Application Priority Data

Aug. 30, 2018 (JP) .............................. JP2018-161821
Sep. 28, 2018 (JP) .............................. JP2018-185271

(51) Int. Cl.
*H01H 3/02* (2006.01)
*H01H 3/12* (2006.01)
*H04Q 9/00* (2006.01)
*H01H 1/20* (2006.01)
*H01H 9/00* (2006.01)

(52) U.S. Cl.
CPC ................. *H04Q 9/00* (2013.01); *H01H 1/20* (2013.01); *H01H 9/0066* (2013.01); *H01H 2001/508* (2013.01); *H01H 2003/024* (2013.01); *H01H 2221/022* (2013.01); *H04Q 2213/003* (2013.01)

(58) Field of Classification Search
CPC ....... H01H 2001/508; H01H 2003/024; H01H 2221/022; H04Q 9/00; H04Q 2213/003
See application file for complete search history.

(56) References Cited

U.S. PATENT DOCUMENTS

| | | | |
|---|---|---|---|
| 9,750,143 B2 | 8/2017 | Meftah et al. | |
| 2010/0106299 A1 | 4/2010 | Nagata | |
| 2013/0134798 A1* | 5/2013 | Meftah | H01H 13/02 |
| | | | 307/104 |
| 2017/0133168 A1* | 5/2017 | Katsube | H01H 1/2025 |
| 2017/0133171 A1* | 5/2017 | Katsube | H01H 13/52 |
| 2018/0141751 A1 | 5/2018 | Muranaka | |
| 2020/0014156 A1* | 1/2020 | I | H01R 13/7137 |

FOREIGN PATENT DOCUMENTS

| | | |
|---|---|---|
| JP | 2001-218280 A | 8/2001 |
| JP | 2006-345470 A | 12/2006 |
| JP | 2007-115703 A | 5/2007 |
| JP | 2010-096433 A | 4/2010 |
| JP | 4872106 B2 | 2/2012 |
| JP | 2015-130235 A | 7/2015 |
| JP | 2015-230826 A | 12/2015 |
| JP | 2015-231211 A | 12/2015 |
| JP | 2016-502248 A | 1/2016 |
| JP | 2017-030077 A | 2/2017 |
| WO | WO 2006/137239 | 12/2006 |
| WO | WO 2016/181734 | 11/2016 |

OTHER PUBLICATIONS

PCT Examiner Miki Kobayashi, PCT International Preliminary Report on Patentability including English Translation of PCT Written Opinion of the International Searching Authority for International Application PCT/JP2018/043651, dated Jun. 2, 2020, 7 pages, International Bureau of WIPO, Geneva, Switzerland.

First Office Action in Japanese Patent Application No. 2017-228191, dated Dec. 20, 2019, 3 pages, with partial English translation, 2 pages.

Second Office Action in Japanese Patent Application No. 2017-228191, dated Mar. 24, 2020, 3 pages, with partial English translation, 2 pages.

* cited by examiner

OPERATION SWITCH UNIT, REMOTE OPERATION TERMINAL AND OPERATION SYSTEM

TECHNICAL FIELD

The present invention relates generally to an operation switch unit, a remote operation terminal and an operation system that have an improved operability and safety.

BACKGROUND ART

An apparatus that includes a push switch is shown in Japanese patent publication No. 4872106 (see paras. [0013], [0015] and FIGS. 1, 2). The apparatus shown in the above JP publication includes a push switch (63) to switch an operation state of a device (20) manually and a controller (1) that has a cylinder (42) to operate the push switch (63) in accordance with a control signal from a control indication unit (30) and a push button (73) contacted by the cylinder (42). The cylinder (42) is provided in a cover (9) disposed in front of the push switch (63).

In the above-mentioned prior-art apparatus, when a user or operator operates the push switch (63), he/she manually depresses a rear portion of the cylinder (42) that is exposed from the cover (9). Then, the cylinder (42) is pressed into the cover (9) to press the push button (73), such that thereby the push switch (63) is depressed (see paras. [0028] and [0029]). On the other hand, when operating the push switch (63) by the control signal from the control indication unit (30), the cylinder (42) presses the press button (73) in response to the control signal from the control indication unit (30), such that thereby the push switch (63) is depressed (see pare. [0016]).

The above-mentioned JP publication describes in paras. [0037] and [0039] that switching changeover operation by the user/operator is not disturbed even in the state that the controller (1) is installed. However, when the user/operator operates the push switch (63) manually, as mentioned above, he/she indirectly operates the push switch (63) through the cylinder (42) and the push button (73) by depressing the rear portion of the cylinder (42). That is, in the apparatus shown in the above-mentioned JP publication, installation of the controller (1) in front of the push switch (63) does not allow the user/operator to directly operate the push switch (63). Thereby, operability is deteriorated at the time of a user's manual operation of the push switch (63). Also, at the time of manual operation, the user must depress the rear portion of the cylinder (42), the rear portion being quite small compared to a front face of the push switch (63), which also indicates that operability is deteriorated at the time of manual operation of the push switch (63).

On the other hand, WO2016/181734 pamphlet shows an emergency stop terminal (200) as a wireless operation terminal that includes a first communication portion (221) which performs a wireless communication between an emergency stop button (210) and a controller (100) to perform a motion control of a stacker crane (30) (see para. [0010] and FIG. 1). The pamphlet describes that at the time of normal operation, the communication portion (221) and the controller (100) are in the state of communication at all times, and when the emergency stop button (210) is depressed, the state of wireless communication between the first communication portion (221) and the controller (100) of the stacker crane (30) is altered, such that thereby the controller (100) breaks a power circuit of the stacker crane (30) to stop the stacker crane (30) (see paras. [0010], [0016], [0068]-[0070], [0073], [0121]-[0123] and FIGS. 2, 3).

Japanese patent application publication No. 2016-502248 describes a control system that includes a fixed-type emergency stop button and a portable emergency stop button. The fixed-type emergency stop button is a wired type that directly acts upon an electric circuit and the portable emergency stop button has a wireless transmitter that communicates with a wireless receiver which controls the same electric circuit (see paras. [0015]-[0017]).

In the prior-art emergency stop terminal and control system shown in the above-mentioned publications, the emergency stop terminal and the portable emergency stop button are structured in such a way as to directly break/control the power circuit/electric circuit of the apparatus wirelessly during operation. Therefore, such a break circuit/control circuit needs to be preinstalled into the circuit of the apparatus, thus making the system complicated. Such a complication of the system results in an increase of a failure rate, which leads to a harmful influence to construction of a safety system. Also, in the event that the break circuit/control circuit is directly controlled by radio, the system is made more complicated due to a bidirectional communication, duplication and the like.

Moreover, an emergency stop switch generally includes a push button (or operation switch) operable by an operator, an operation axis slidable by pressing operation of the push button, and contacts to be turned on/off according to a movement of the operation axis (see FIG. 1 of Japanese patent application publication No. 2001-35302). At the time of operation of the emergency stop switch, the movement of the operation axis causes the contacts to be turned off to break the electric circuit of the apparatus, thus making the apparatus stop emergently.

In the prior-art emergency stop switch, the operator needs to be so close to the emergency stop switch in operating the push button. He/she was not able to operate the emergency stop switch at a place apart from the emergency stop switch. Therefore, there has been a demand for an emergency stop switch with an operation support function that enables operation even at a place apart from the emergency stop switch. On the other hand, in the emergency stop switch, even when the switch has been damaged it should be avoided from a safety point of view that the contacts turn to a contact state again.

PRIOR ART REFERENCES

Patent Documents i) Japanese Patent No. 4872106 (see paras. [0013], [0015], [0016], [0028], [0029], [0037] and [0039], and FIGS. 1 and 2);

ii) International Patent Publication WO 2016/181734 (see paras. [0010], [0016], [0068]-[0070], [0073] and [0121]-[0123], and FIGS. 1-3);

iii) Japanese Patent Application Publication No. 2016-502248 (see paras. [0015]-[0017]); and iv) Japanese Patent Application Publication No. 2001-35302 (see FIG. 1).

SUMMARY OF THE INVENTION

Objects to be Achieved by the Invention

The present invention has been made in view of these circumstances and its object is to provide an operation switch unit that can directly and alternatively operate an operation switch to improve operability and safety. Another object of the present invention is to easily build a system that can operate an operation switch remotely to improve operability and safety.

Means of Achieving the Objects

In one aspect, the present invention is an operation switch unit. The operation switch unit may include a direct operation part that has a manually operable operation switch and that is adapted to directly operate the operation switch, and an alternative operation part that is adapted to be linked with the direct operation part and that alternatively operates the operation switch in place of the direct operation part.

According to the present invention, the operation switch is directly operated by the direct operation part and alternatively operated by the alternative operation part. Thereby, the operation switch can be operated by both direct operation and alternative operation, thus improving operability and safety.

The operation switch may be an emergency stop switch. In the state of linkage with the direct operation part, the alternative operation part does not impair any requirement that is required for the emergency stop switch. Thereby, even in the state that the alternative operation part is linked with the direct operation part, the operation switch can perform an original emergency stop function as an emergency stop switch.

The alternative operation part may include a detection part that detects a remote operation of the operation switch and an actuating portion that actuates the operation switch on the basis of the remote operation detected by the detection part. In this case, when the remote operation of the operation switch is detected by the detection part, the operation switch is alternatively operated to be actuated by the actuating portion based on the remote control. Thereby, the operation switch can be operated from a distance (that is, operation support can be achieved), thus further improving operability and safety.

The actuating portion may be provided at a position that is not a manual operation surface of the operation switch. Thereby, when the operation switch is directly operated by the direct operation part, the alternative operation part does not hinder the direct operation and operability is not impaired.

A reset of the operation switch after actuation by the actuating portion may be performed by an operator's manually operation of the operation switch.

The operation switch may be a switch adapted to open a first contact and a second contact that are in the state of contact. The operation switch may further comprise an opening biasing means to bias the first contact and the second contact to an opening direction. In this case, since the first contact and the second contact of the operation switch are biased to the opening direction by the opening biasing means, the first contact and the second contact can be put in an opening sate even if the operation switch is damaged, thereby further enhancing safety.

The opening biasing means may maintain the opening state of the first contact and the second contact by biasing the first contact and the second contact to the opening direction even in the case that abnormality such that the first contact and the second contact return to the state of contact has occurred. By so doing, the first contact and the second contact can be put in an opening sate even if the operation switch is damaged, thereby further enhancing safety.

A biasing force of the opening biasing means may be applied to an actuating portion in an operative direction to actuate the operation switch, such that thereby a load can be reduced when the actuating portion actuates the operation switch thus lowering an output of the actuating portion to decrease a cost.

A biasing force of the opening biasing means may be applied to the operation switch in an operative direction, such that thereby when the first contact and the second contact are caused to be opened by operation of the operation switch the biasing force of the opening biasing means is applied in the same direction as the operative direction of the operation switch. As a result, the first contact and the second contact can be opened more securely.

A biasing force of the opening biasing means after operation of the operation switch may be smaller than a biasing force of the opening biasing means before operation of the operation switch. Thereby, after operation of the operation switch, an elastic energy that the opening biasing means possessed is decreased and thus an elastic energy after opening of the contacts by the opening biasing means is lower than an elastic energy before opening of the contacts. As a result, even if the operation switch is damaged after operation of the operation switch, the first contact and the second contact do not return to the contact state again, thus further enhancing safety.

The operation switch unit may further comprise an operation axis to move in conjunction with operation of the operation switch. The opening biasing means may be formed of a spring that has one end connected to the side of the operation axis and adapted to move along with the operation axis and that has the other end connected to the side of a housing of the operation switch unit. In this case, a biasing force by the opening biasing means acts between the housing and the operation axis, such that thereby the first contact and the second contact are biased in the opening direction.

The operation switch may be an emergency stop switch.

In another aspect, the present invention is a remote operation terminal for operating a manually operable operation switch remotely. The remote operation terminal may comprise an operation element operated by an operator and a remote operation means for operating the operation switch remotely by the operator's operation of the operation element.

According to the present invention, when the operator operates the operation element, the operation switch is operated remotely by the remote operation means. In this case, the remote operation means does not directly control a power circuit or an electric circuit of an apparatus but indirectly controls the apparatus through the operation switch by acting onto the operation switch of the apparatus to operate the operation switch. A switch such as an emergency stop switch, a stop switch or the like as an operation switch is normally fitted to the apparatus externally. According to the present invention, by operating this kind of an operation switch, such a system as to operate the apparatus remotely can be easily structured and operability and safety of the system can be improved.

The operation switch may be an emergency stop switch and the operation element may be a button.

The operation element may include a locking mechanism to be locked in the state of operation.

The remote operation means may be a transmission part to transmit an operation signal for operating the operation switch wirelessly.

In yet another aspect, the present invention is an operation system. The operation system may comprise a manually operable operation switch, a remote operation means for operating the operation switch remotely, a detection part that detects the remote operation by the remote operation means, and an actuating portion that actuates the operation switch on the basis of the remote operation detected by the detection part.

According to the present invention, when the operation switch is operated remotely by the remote operation means, the detection part detects the remote operation by the remote operation means and then actuating portion actuates the operation switch on the basis of the remote operation detected by the detection part. Thereby, the operation can be performed at a place away from the operation switch thus improving operability and safety.

The operation system may further comprise an opening biasing means to bias a contact of the operation switch to an opening direction. Thereby, even in the event that the switch has been damaged, the contact can be put at an open state thus further improving safety.

The remote operation means may be a transmission part to transmit an operation signal for operating the operation switch wirelessly and the detection part may be a reception part to receive the operation signal from the transmission part.

In the operation system according to yet another aspect of the present invention, a reset of the operation switch after actuation by the actuating portion may be performed by an operator's manually operation of the operation switch.

Effects of the Invention

According to the present invention, the operation switch can be operated by both direct operation and alternative operation, thus improving operability and safety.

BEST MODE FOR CARRYING OUT THE INVENTION

Figure 1:
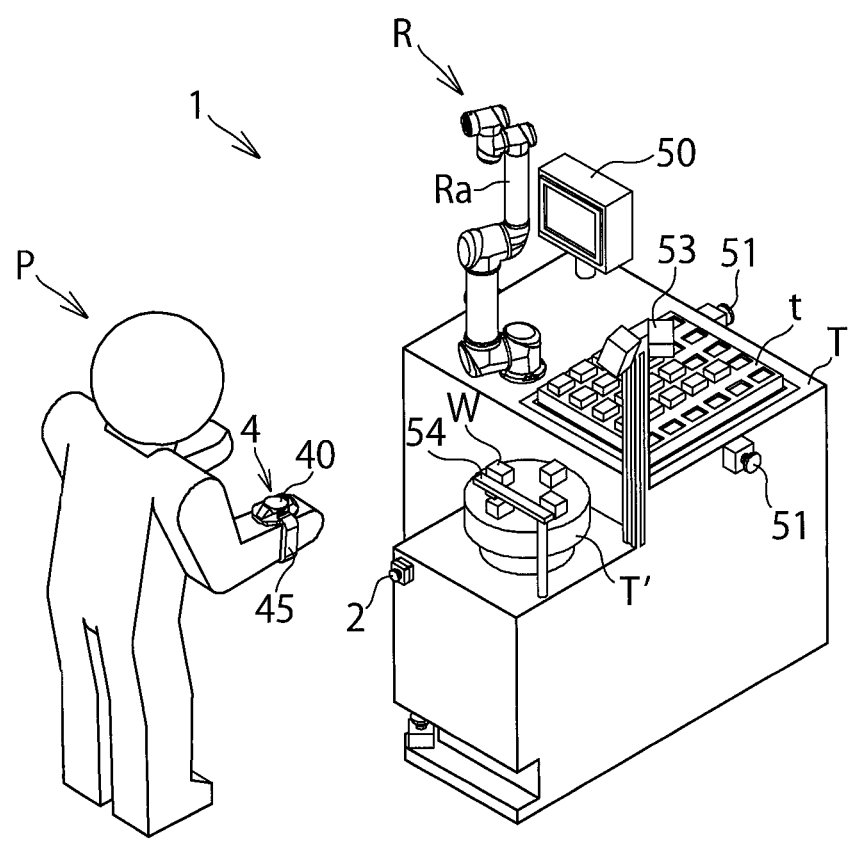
FIG. 1 is a general perspective view of an example of the operation system incorporating the emergency stop switch unit as an operation switch unit according to an embodiment of the present invention.
Figure 2:
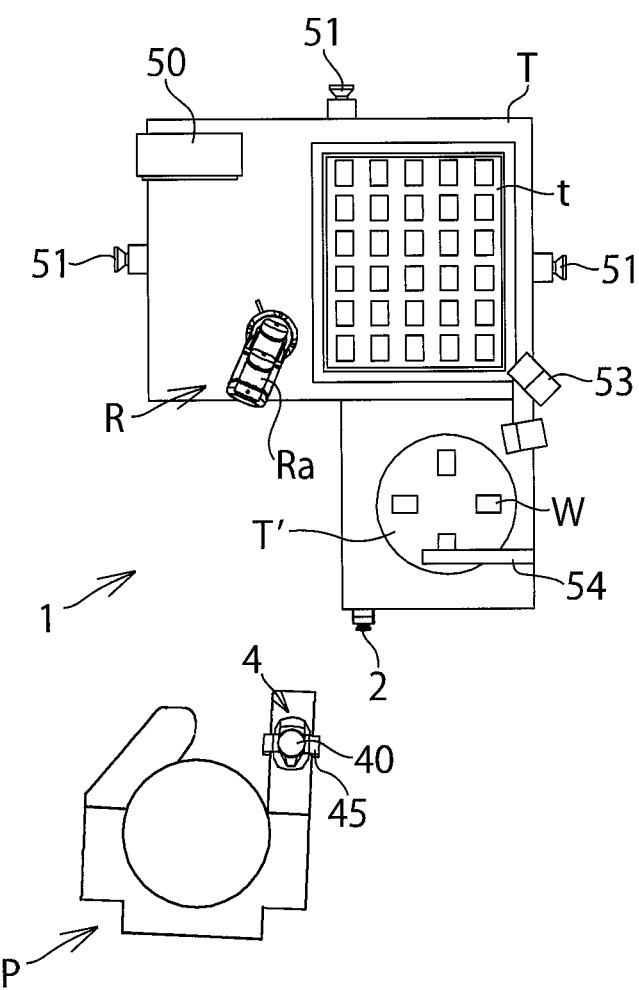
FIG. 2 is a top plan view of the operation system of FIG. 1.
Figure 3:
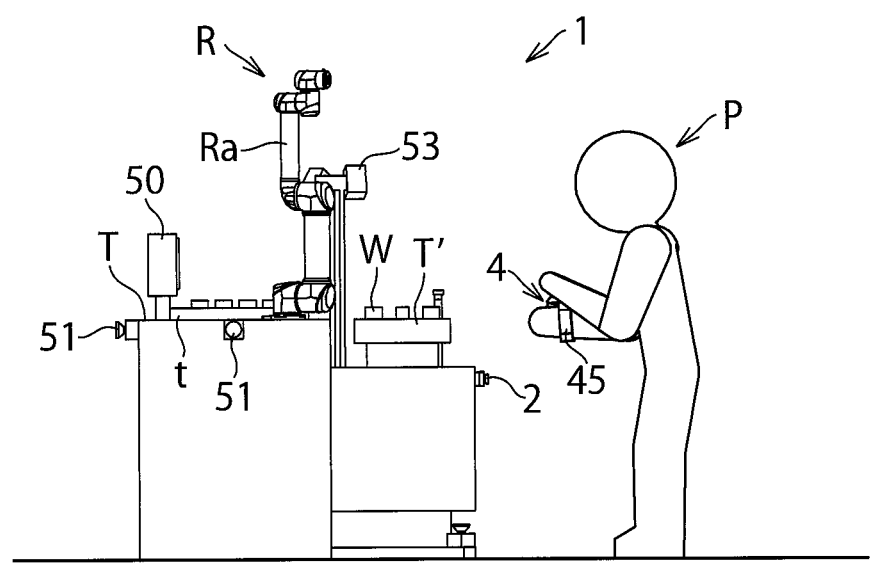
FIG. 3 is a side view of the operation system of FIG. 1.
Figure 4:
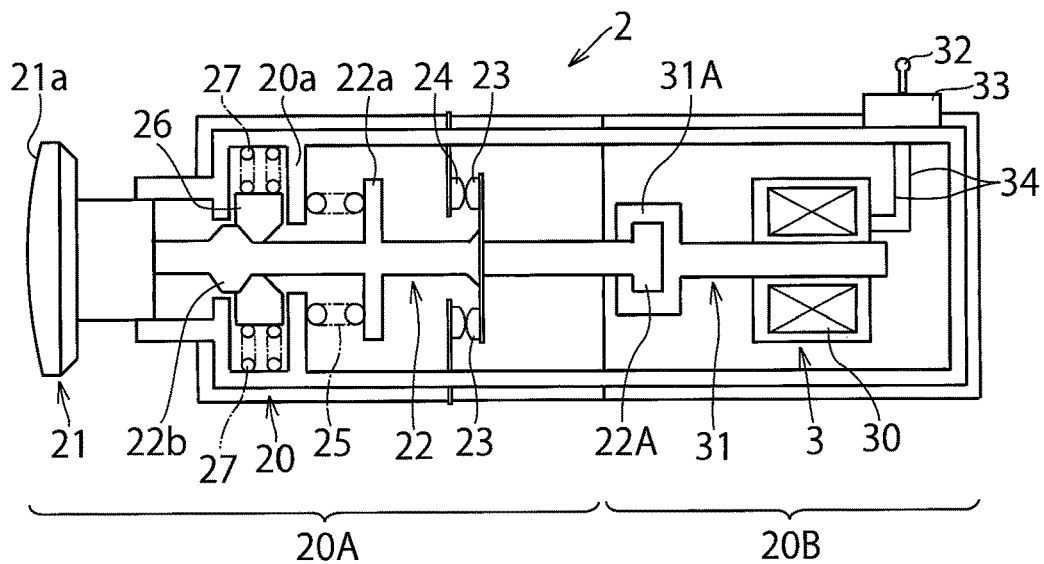
FIG. 4 is a longitudinal sectional view of the emergency stop switch unit of FIG. 1 illustrating the state of non-operation of the emergency stop switch unit.
Figure 5:
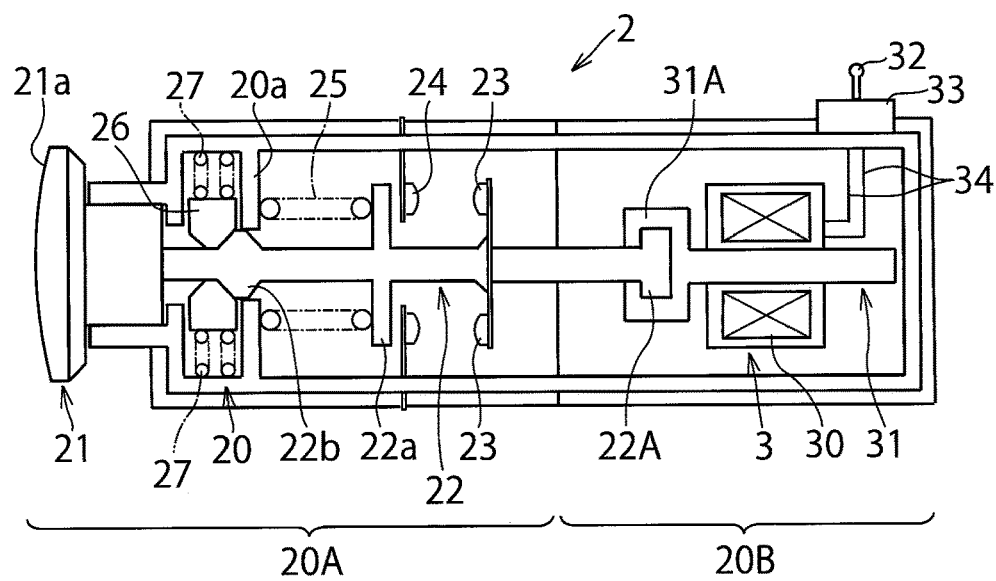
FIG. 5 is a longitudinal sectional view of the emergency stop switch unit of FIG. 1 illustrating the state of operation (direct operation/indirect operation) of the emergency stop switch unit.
Figure 6:
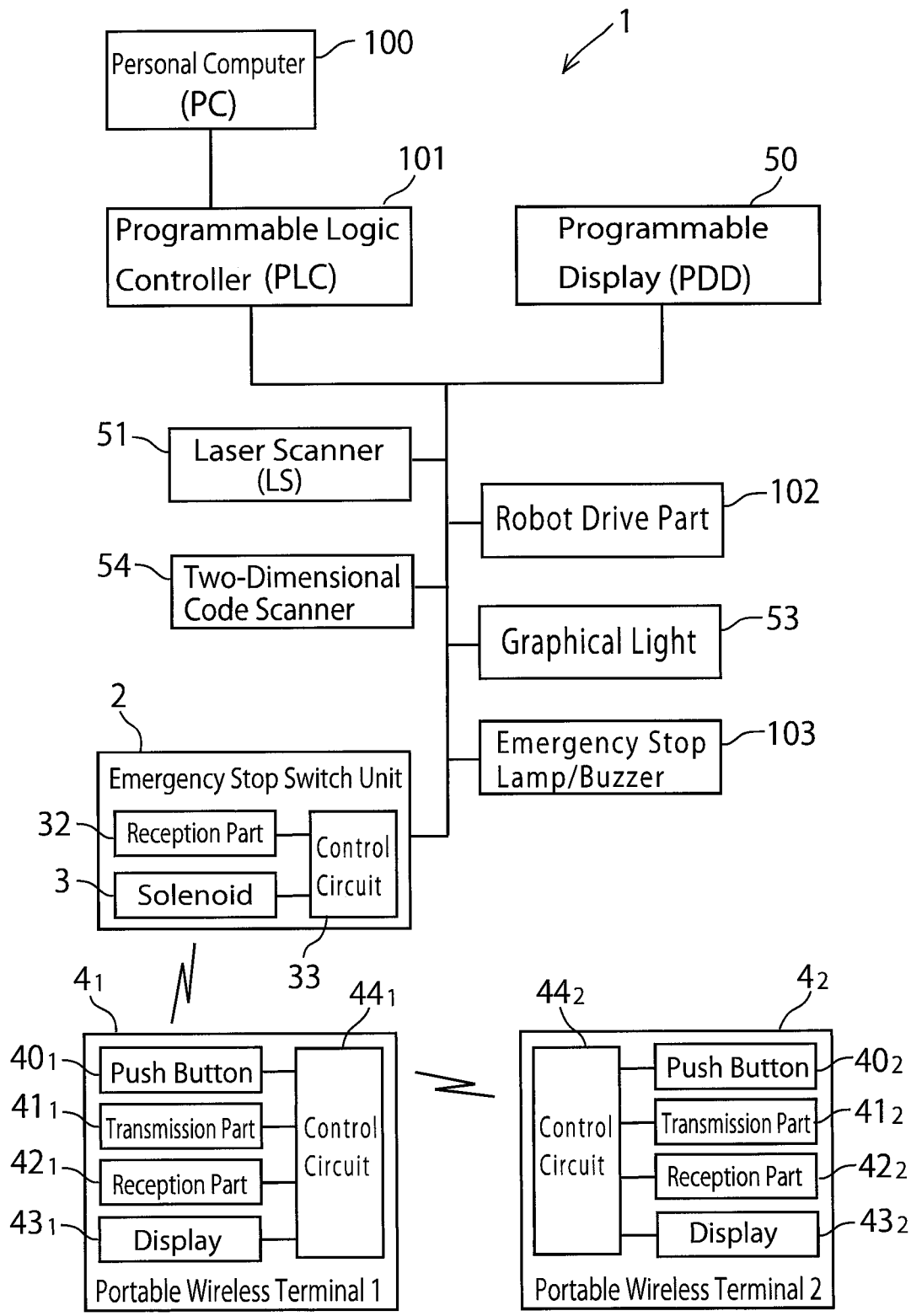
FIG. 6 is a schematic illustrating an example of a block diagram of the operation system of FIG. 1.

The present invention will now be described in detail with reference to embodiments thereof as illustrated in the accompanying drawings. Referring to the drawings, FIGS. 1 to 6 show an emergency switch unit (or an operation switch unit) and an operation system employing the emergency switch unit according to an embodiment of the present invention. In these drawings, FIGS. 1 to 3 illustrate an entire operation system. FIGS. 4 and 5 illustrate an internal schematic structure of the emergency stop switch unit. FIG. 6 illustrates a block diagram of the operation system.

As shown in FIGS. 1 to 3, the operation system 1 may include a robot (or an apparatus) R. A worker (or an operator) P may be near the robot R. The robot R may be a collaborative (or a cooperative) robot that performs work in collaboration (or cooperation) with the worker P. During operation, the robot R may pick up a work W on a sub-table T' by a hand at a distal end of a robot arm Ra and put it sequentially at a predetermined position in a tray t disposed on a work table T. On the other hand, the worked P may put a work W sequentially at a vacant position on the sub-table T' during operation of the robot R.

A programmable display 50 may be disposed on the work table T. The programable display 50 may have a display such as an LCD (i.e. Liquid Crystal Display) or an organic EL (i.e. electroluminescence) display and store a control program of the robot R. Safety laser scanners 51 may be disposed on a side surface, for example, each side surface and a rear surface, of the table T. Each laser scanner 51 detects an approach of the worker P or other persons. An emergency stop switch unit (or an operation switch unit) 2 is disposed on a front surface of the table T to urgently stop the robot R. The worker P has a portable (or wearable) wireless terminal (or remote operation terminal) 4 mounted on a wrist of a hand. The wireless terminal 4 remote-controls the emergency stop switch unit 2 and it includes a push button 40 operable by the other hand or finger of the worker P and a belt 45 holding the push button 40 and wrapped around the wrist of the worker P. A graphical light 53 may be fitted near the table T. The graphical light 53 informs the worker P of an advance information of the robot R by irradiating a next mobile spot with a light where the robot hand at a distal end of the robot arm Ra moves to. A two-dimensional code scanner 54 may be disposed on the sub-table T' to read a two-dimensional code, or a work information assigned to the work W.

Then, the internal structure of the emergency stop switch unit 2 will be explained hereinafter in reference to FIGS. 4 and 5.

FIG. 4 shows the state of non-operation of the emergency stop switch unit and FIG. 5 shows the state of operation (i.e. direct operation/alternative operation) of the emergency stop switch unit. In these drawings, hatching is omitted for illustration purposes.

As shown in FIGS. 4 and 5, the emergency stop switch unit 2 includes the following elements: a case (or housing) 20; an emergency stop button (or emergency stop switch/operation switch) 21 that is provided at one end of the case 20, that is slidably supported in the axial direction in the case 20, and that has a pressure surface (or direct operation surface) 21a to be pressed manually (or directly operated) by the worker P; an axial portion (or operation axis) 22 extending axially in the case 20 and connected to a rear surface on the opposite side of the pressure surface 21a of the emergency stop button 21; a movable contact 23 fitted to a generally middle of the axial portion 22 and movable along with the axial portion 22; a fixed contact 24 fixedly attached to an internal wall surface of the case 20 and oppositely disposed to the movable contact 23; an electromagnetic solenoid (or actuating portion) 3 provided in the case 20 on the other end side of the case 20, that is, on the rear side opposite the front side or pressing side relative to the pressure surface 21a of the emergency stop button 21, i.e. at a position other than the pressure surface 21a; a reception part (or detection part) 32 fitted to the external wall surface of the case 20 and receiving a radio signal from the wireless terminal 4; and a control circuit 33 that controls a drive of the solenoid 3 on the basis of the radio signal received (or detected) by the reception part 32. The control circuit 33 is connected to the solenoid 3 through a lead wire 34.

The axial portion 22 has a flange part 22a protruding radially outwardly at an approximately center of the axial portion 22. One end of a coil spring (or opening biasing means) 25 is in contact and engagement with the flange part 22a. The other end of the coil spring 25 is in contact and engagement with a projecting part 20a that projects radially inwardly from the internal wall surface of the case 20. The coil spring 25 is in a compressed state in an axial space between the projecting part 20a and the flange part 22a such that the coil spring 25 imparts an elastic repulsion (or biasing force) to the projecting part 20a and the flange part 22a. Such an elastic repulsion biases the movable contact 23 away from the fixed contact 24, that is, in a contact-opening direction i.e. to the right side of FIG. 4. Therefore, one end of the coil spring 25 moves along with the movement of the axial portion 22.

In this example, an axial line of the coil spring 25 coincides with an axial line of the axial portion 22. The elastic repulsion of the coil spring 25 acts in a pressing direction of the emergency stop button 21 and in an operative direction of the solenoid 3 relative to the axial portion 22. Also, at the time of non-operation of the emergency stop switch 2 shown in FIG. 4, the coil spring 25 is in a maximum compressive state between the projecting part 20a and the flange part 22a. The elastic repulsion of the coil spring 25 is at a maximum value and the coil spring 25 holds the greatest elastic energy. To the contrary, at the time of operation of the emergency stop switch unit 2 shown in FIG. 5, the coil spring 25 extends axially from the state of FIG. 4. The elastic repulsion of the coil spring 25 decreases and thus the elastic energy of the coil spring 25 is reduced.

The axial portion 22 includes a pair of protruding parts 22b that protrude radially outwardly in the vicinity of the emergency stop button 21. Each of the protruding part 22b has a trapezoidal shape with a pair of inclined surfaces in a longitudinal cross section. On the other hand, there are provided a pair of engagement members 26 in the case 20. Each of the engagement members 26 has a pair of inclined surfaces that are engageable with the corresponding inclined surfaces of the protruding part 22b. Each of the engagement members 26 is biased toward the corresponding protruding part 22b by an elastic repulsion of a spring 27 disposed in the case 20. At the time of non-operation shown in FIG. 4, the left-hand-side inclined surface of the engagement member 26 as shown in the drawing engages with the right-hand-side inclined surface of the protruding part 22b as shown in the drawing, whereas at the time of operation shown in FIG. 5, the right-hand-side inclined surface of the engagement member 26 as shown in the drawing engages with the left-hand-side inclined surface of the protruding part 22b as shown in the drawing.

The axial portion 22 includes an engaged part 22A at a distal end thereof. In this example, the engaged part 22A has a cylindrical shape whose diameter is greater than that of the axial portion 22. The solenoid 3 has a solenoid body (or electromagnetic coil portion) 30. A plunger 31 is slidably inserted into the solenoid body 30. The plunger 31 is concentrically disposed with the axial portion 22. The plunger 31 includes an engaging part 31A at a distal end thereof, which is engageable with the engaged part 22A of the axial portion 22. In this example, the engaging part 31A has a cylindrical shape whose diameter is greater than that of the plunger 31. The engaged part 22A at the distal end of the axial portion 22 is inserted into and engaged with an inside hole of the engaging part 31A of the plunger 31. Thereby, the axial portion 22 and the plunger 31 are interconnected with each other and adapted to move integrally with each other.

As shown in FIGS. 4 and 5, the emergency stop switch unit 2 comprises an direct operation part 20A that includes the emergency stop switch 21 and the axial portion 22 and that is adapted to directly operate the emergency stop button 21, and an alternative operation part 20B that includes the plunger 31 and the solenoid 3 and that is adapted to alternatively operate the emergency stop button 21 in lieu of the direct operation part 20A. The alternative operation part 20B is adapted to be linked with the direct operation part 20A through the engaging part 31A of the plunger 31 and the engaged part 22A of the axial portion 22. In addition, the direct operation part 20A and the alternative operation part 20B may be detachably or releasably constructed from each other. In this case, since the alternative operation part 20B can be retrofitted to the direct operation part 20A, it becomes easy for the emergency stop switch unit 2 to be converted into a wireless type. Conversely, when conversion into a wireless type is not necessary, all you have to do is to remove the alternative operation part 20B from the emergency stop switch unit 2 and thus it is easy to be adapted.

Figure 5A:
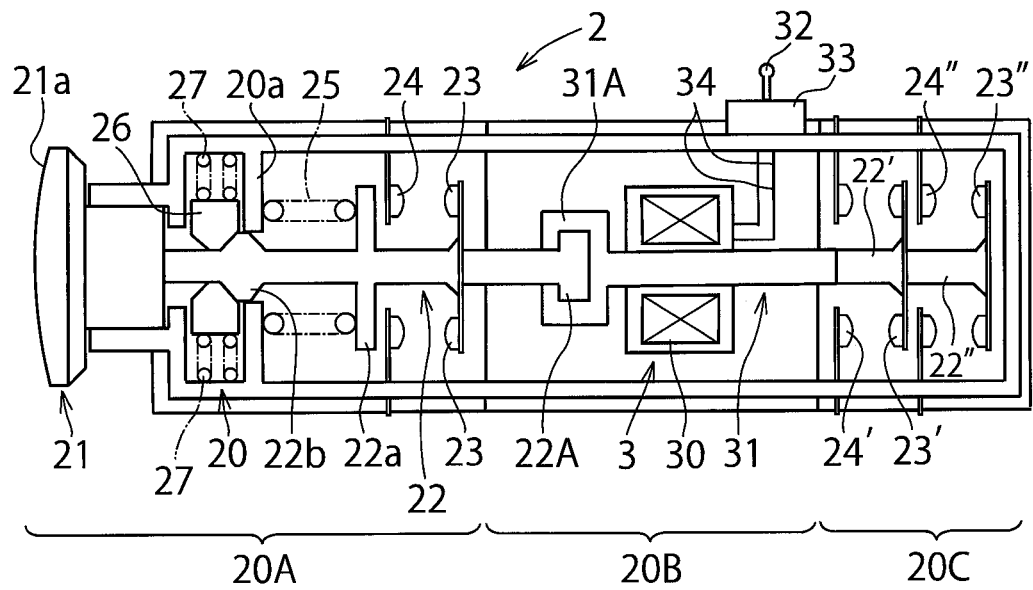
FIG. 5A shows an exemplification in which an extension unit is added to the rear end of the emergency stop switch unit of FIG. 5.
Figure 5B:
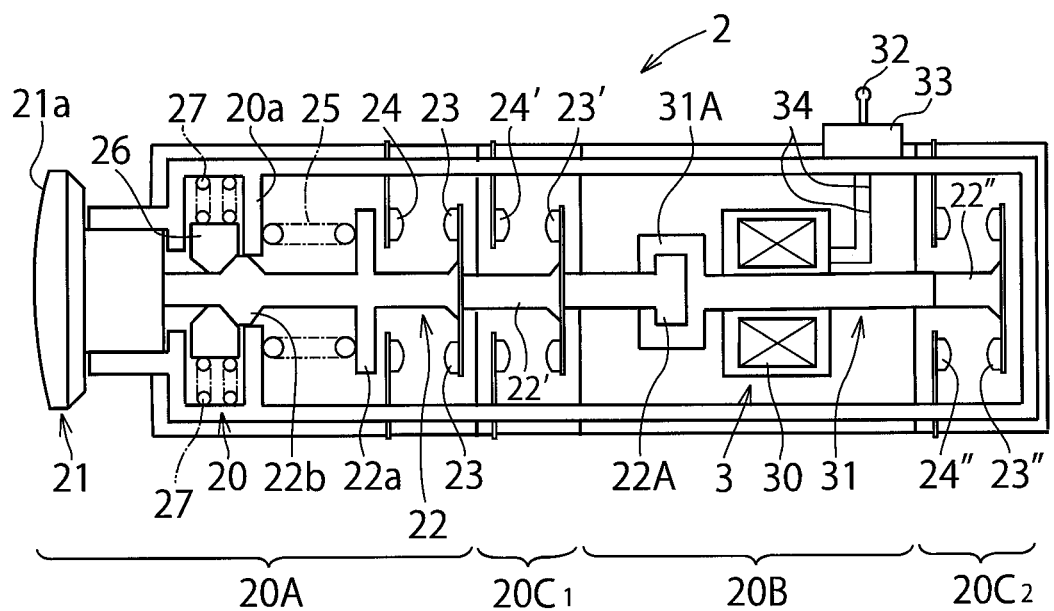
FIG. 5B shows an exemplification in which an extension unit is added to the rear end and the middle of the emergency stop switch unit of FIG. 5.

FIGS. 5A and 5B illustrate an example in which extension units 20C, $20C_1$, $20C_2$ are respectively added to the emergency stop switch unit 2 of FIG. 5. In FIG. 5A, the extension unit 20C is disposed at a rear end of the emergency stop unit 2 (thus at a rear end of the alternative operation part 20B) and comprises a first extension unit composed of a fixed contact 24' and a movable contact 23' and a second extension unit composed of a fixed contact 24" and a movable contact 23". The first extension unit of the extension unit 20C is adapted to be linked with the plunger 31 via the axial portion 22' and the second extension unit is adapted to be linked with the first extension unit via the axial portion 22". The first and second extension units are releasable from each other. In addition, the extension unit 20C may be formed of a single extension unit or three or more extension units including a third extension unit.

In FIG. 5B, the extension unit $20C_1$ is disposed at a mid-portion of the emergency stop switch unit 2, that is, between the direct operation part 20A and the alternative operation part 20B (i.e. at the front end of the alternative operation part 20B). The extension unit $20C_2$ is disposed at the rear end of the emergency stop switch unit 2 (thus at the rear of the alternative operation part 20B). The extension unit $20C_1$ is composed of a fixed contact 24' and a movable contact 23' and adapted to be linked with the axial portion 22 of the direct operation part 20A via the axial portion 22'. The extension unit $20C_1$ is detachable from the direct operation part 20A. The extension unit $20C_2$ is composed of a fixed contact 24" and a movable contact 23" and adapted to be linked with the plunger 31 via the axial portion 22". The extension unit $20C_2$ is detachable from the alternative operation part 20B. In addition, the extension units $20C_1$ and $20C_2$ may be respectively formed of two or more extension units. Also, only the extension unit $20C_1$ may be provided without providing the extension unit $20C_2$.

Accordingly, in the emergency stop switch unit 2, extension units can be easily retrofitted and added to the unit 2 and also easily detachable from the unit 2, thus facilitating an increase and decrease of the contacts. Moreover, in this case as well, since the alternative operation part 20B can be retrofitted directly (or via an extension unit) to the direct operation unit 20A, it becomes easy for the emergency stop switch unit 2 to be converted into a wireless type. When conversion into a wireless type is not necessary, all you have to do is to remove the alternative operation part 20B from the emergency stop switch unit 2 and thus it is easy to be adapted.

Next, FIG. 6 shows a schematic block diagram of the operation system 1. As shown in FIG. 6, the operation system 1 includes a personal computer (PC) 100 for programming, inputting data and outputting display data, a programmable logic controller (PLC) 101 connected to PC 100, and a programmable display (PDD) 50 connected to PLC 101. A robot control program is stored in PLC 101/PDD 50. Also, the laser scanner (LS) 51, the two-dimensional code scanner 54, the emergency stop switch 2, a robot drive part 102 including an actuator and a motor, the graphical light 53, and an emergency stop lamp/buzzer 103 are connected to PLC 101/PDD 50. In addition, the constitution of the operation system 1 according to the present invention is not limited to that of FIG. 6. Either PC 100, PLC 101 or PDD 50 may be omitted.

In this example, the portable-type wireless terminal 4 is formed of a plurality of wireless terminals $4_1$, $4_2$, . . . (In FIG. 6, only two terminals $4_1$ and $4_2$ are shown). The wireless terminal $4_1$ may have a wireless module fitted therein, which includes a push button $40_1$, a transmission part $41_1$, a reception part $42_1$, a display $43_1$, and a control circuit $44_1$ which the above-mentioned elements are connected to. Similarly, the wireless terminal $4_2$ may have a wireless module fitted therein, which includes a push button $40_2$, a transmission part $41_2$, a reception part $42_2$, a display $43_2$, and a control circuit $44_2$ which the above-mentioned elements are connected to. The wireless terminals $4_1$ and $4_2$ may be respectively held by workers $P_1$ and $P_2$ both of whom work near the robot R. Alternatively, the wireless terminal $4_1$ may be held by the worker P who works near the robot R and the wireless terminal $4_2$ may be held by a supervisor who supervises the worker P apart from the robot R.

The transmission parts $41_1$ and $41_2$ are provided for transmitting an operation (or stop) signal to remote-control the alternative operation part 20B of the emergency stop unit 2 wirelessly when the push buttons $40_1$ and $40_2$ are pressed. The transmission parts $41_1$ and $41_2$ are transmissible wirelessly relative to the reception part 32 of the alternative operation part 20B. The reception part $42_1$ (or $42_2$) is provided for receiving a stop signal transmitted from the transmission part $41_2$ (or $41_1$) of another wireless terminal $4_2$ (or $4_1$). That is, the transmission parts $41_1$, $41_2$ and the reception parts $42_1$, $42_2$ of the wireless terminals $4_1$, $4_2$ are mutually radio-transmissible. The displays $43_1$, $43_2$ are provided for display-illumination such as lighting when a worker presses the push buttons $40_1$, $40_2$, display-illumination such as blinking/flickering when another worker presses the push button first, indication of a radio wave intensity level, alarm-display of a dead battery and a radio communication disabled state, and the like. For example, radio communications that may be used in this embodiment of the present invention are as follows: Wi-Fi® communication, BLUETOOTH® communication, ZIGBEE® communication, BLE (Bluetooth® Low Energy communication) communication, WiMAX® communication, infrared communication, and the like.

Next, actions and effects of the present invention will be explained hereinafter.

During operation, the robot R is operated in accordance with the robot control program stored in the PLC 101/PDD 50. The worker P does jobs in cooperation with the robot R such as placing a work W on the sub-table T' in accordance with the predetermined procedures. At this time, as shown in FIG. 4, the emergency stop switch unit 2 is in the state of non-operation that the emergency stop button 21 is not pressed, and the movable contact 23 and the fixed contact 24 are in contact with each other.

When the worker P press-operates manually (or direct-operates) the emergency stop button 21 of the emergency stop switch unit 2 during operation of the robot R, the axial portion 22 is pressed inwardly along with the emergency stop button 21. With the movement of the axial portion 22, the inclined surfaces of the protruding parts 22b of the axial portion 22 cross over the corresponding inclined surfaces of the engagement members 26 against the elastic repulsion of the spring 27, such that thereby the state shown in FIG. 4 is shifted to the state shown in FIG. 5. At this time, the other inclined surfaces of the protruding parts 22b of the axial portion 22 comes into engagement with the other inclined surfaces of the engagement members 26. Also, the movable contact 23 moves along with the axial portion 22 and away from the fixed contact 24 to open the contacts. As a result, the operation of the robot R stops.

When press-operating the emergency stop button 21 of the emergency stop switch unit 2, the plunger 31 connected to the axial portion 22 is also pressed inwardly. At this juncture, a current is not supplied to the solenoid body 30. Therefore, there is no sliding resistance during movement of the plunger 31, thus allowing for the plunger 31 to move smoothly (i.e. without a load). Accordingly, a press-operation of the emergency stop button 21 by the worker P can be performed exactly in the same manner as a press-operation of a conventional emergency stop switch without a solenoid. That is to say, in the state that the alternative operation part 20B is linked with the direct operation part 20A, a direct operation of the emergency stop button 21 is not obstructed, such that thereby not only the original switching function as an operation switch (i.e. opening/closing action or ON/OFF action, etc.) can be achieved but also no requirement required for the emergency stop switch is impaired. Here, there is ISO 13850 as a standard concerning an emergency stop function. The emergency stop switch unit 2 can satisfy the requirement for an emergency stop function (for example, an electric contact has a direct open-circuit operating mechanism, etc.) prescribed in ISO 13850 even in the state that the alternative operation part 20B is linked with the direct operation part 20A.

Then, when performing a resetting operation for restoring to the original state shown in FIG. 4 from the state shown in FIG. 5, the worker P grasps the emergency stop button 21 to pull it forward (i.e. operate it manually). In addition, regarding the resetting operation, by adopting a locking mechanism such as a push-lock and turn-reset mechanism, the locking state held by the internal locking mechanism at the time of push-operation of the emergency stop button 21 may be unlocked by turning the emergency stop button 21.

On the other hand, during operation of the robot R, when the worker P presses the press button 40 ($40_1$ or $40_2$) of the wireless terminal 4 ($4_1$ or $4_2$), the transmitting part $41_1$ ($41_2$) of the wireless terminal 4 ($4_1$ or $4_2$) transmits an operation (or stop) signal (see FIG. 6). The operation signal transmitted from the wireless terminal 4 ($4_1$ or $4_2$) is received by the reception part 32 of the alternative operation part 20B of the emergency stop switch unit 2 and inputted to the control circuit 33. Then, a current is supplied from the control circuit 33 to the solenoid body 30 of the solenoid 3, such that thereby the plunger 31 of the solenoid 3 is drawn inwardly to move to the right-hand side as shown in FIG. 5. As a result, the axial portion 22 connected to the plunger 31 also moves to the right-hand side of FIG. 5. At this time, a collaborative relationship between the inclined surfaces of the protruding parts 22b and the corresponding inclined surfaces of the engagement member 26 is similar to that of a push-operation of the emergency stop button 21. The movable contact 23 moving along with the axial portion 22 travels away from the fixed contact 24 thus causing the operation of the robot R to stop.

At this juncture, the emergency stop button 21 is in a pushed-in state by moving along with the axial portion 22. Such a state is exactly the same as a state in which the worker P manually press-operates the emergency stop button 21. When performing a resetting operation for restoring to the original state shown in FIG. 4 from the state shown in FIG. 5, after a current supply to the solenoid 3 has been stopped, the worker P grasps the emergency stop button 21 to pull it forward (i.e. operate it manually) as with the push-operation of the emergency stop button 21 (see para. [0056]). Alternatively, as mentioned above, by employing a locking mechanism such as a push-lock and turn-reset mechanism, the locking state held by the internal locking mechanism at the time of push-operation of the emergency stop button 21 may be unlocked by turning the emergency stop button 21.

According to this embodiment, by the worker's manual press-operation (or direct-operation) of the emergency stop button 21 of the direct operation part 20A, the emergency stop button 21 is directly operated. Also, by a current supply to the solenoid 3 of the alternative operation part 20B, the emergency stop button 21 is alternatively operated through the plunger 31 and the axial portion 22 in lieu of the direct operation part 20A. Thereby, both the direct operation and the alternative operation of the emergency stop button 21 can be achieved thus improving operability and safety. Moreover, an installation of the alternative operation part 20B does not hinder the direct operation of the emergency stop button 21. Thereby, not only the original switching function (or opening/closing operation, ON/OFF operation, etc.) as an operation switch can be achieved but also the requirements for an emergency stop function (see ISO 13850) required as an emergency stop switch are not impaired.

Also, the remote operation of the wireless terminal 4 for the alternative operation part 20B is detected by the reception part 32 and the alternative operation part 20B is actuated based on the remote operation, that is, the emergency stop button 21 is pressed inwardly, such that thereby the emergency stop button 21 can be operated even at a place away from the emergency stop switch unit 2. Accordingly, even in the situation that the worker P cannot press the emergency stop button 21 directly, he/she can operate the emergency stop button 21 (i.e. perform an operation support of the emergency stop switch unit 2) thus further improving an operability and safety. Moreover, according to the embodiment, since the solenoid 3 is disposed on the side opposite to a press side (or direct operation side) of the emergency stop button 21, the worker P can perform an alternative operation of the emergency stop button 21 without damaging operability at the time of performing the direct operation of the emergency stop button 21.

Furthermore, according to this embodiment, the coil spring 25 biases the movable contact 23 to the opening side relative to the fixed contact 24 at all times (i.e. before and after the operation of the emergency stop switch unit 2). Accordingly, especially after operation of the emergency stop switch unit 2, when a malfunction of the emergency stop switch unit 2 occurs such that the movable contact 23 returns to the state in contact with the fixed contact 24, both contacts 23, 24 are biased to open by the action of an elastic repulsion of the coil spring 25 and the both contacts 23, 24 can be maintained in an open state. Therefore, the movable contact 23 and the fixed contact 24 are not caused to be contacted to each other thus securing safety. In such a manner, according to the embodiment, safety can be further enhanced.

Moreover, according to this embodiment, since the elastic repulsion of the coil spring 25 is imparted in a press direction of the emergency stop button 21, when the movable contact 23 is caused to forcibly open relative to the fixed contact 24 by a press operation of the emergency stop button 21, the elastic repulsion of the coil spring 25 acts in the same direction as the press direction of the emergency stop button 21. As a result, the movable contact 23 can be caused to open relative to the fixed contact 24 more securely. In addition, since the elastic repulsion of the coil spring 25 acts in an actuating direction (i.e. a tensile direction of the plunger 31) of the solenoid 3 relative to the axial portion 22, a load can be released at the time of operating the emergency stop button 21 by the solenoid 3, thereby decreasing an output of the solenoid 3 and reducing a cost.

Also, according to this embodiment, the elastic repulsion of the coil spring 25 after operation of the emergency stop button 21 is decreased relative to the elastic repulsion of the coil spring 25 before operation of the emergency stop button 21. Therefore, after operation of the emergency stop button 21, an elastic energy held by the coil spring 25 is decreased and thus the elastic energy of the coil spring 25 after opening of the contact is lower than the elastic energy of the coil spring 25 before opening of the contact. As a result, even in case that the emergency stop switch unit 2 has malfunctioned after operation of the emergency stop button 21, the mobile contact 23 and the fixed contact 24 do not return to the state in contact with each other thus further enhancing safety.

In this embodiment, as a most preferred embodiment, an example was shown in which an action direction of the elastic repulsion of the coil spring 25 coincides with an action direction of the solenoid 3, but both action directions do not entirely coincide with each other. For example, the elastic repulsion of the coil spring 25 may act at an angle to the action direction of the solenoid 3. In such a case, an axial component of the elastic repulsion coincides with the action direction of the solenoid 3, which can be expected a certain degree of effect. Similarly, in this embodiment, as a most preferred embodiment, an example was shown in which the action direction of the elastic repulsion of the coil spring 25 coincides with a press direction of the emergency stop button 21, but both action directions do not entirely coincide with each other. For example, the elastic repulsion of the coil spring 25 may act at an angle to the axial direction of the axial portion 22. In such a case, the axial component of the elastic repulsion coincides with the press direction of the emergency stop button 21, which can be expected a certain degree of effect.

In this embodiment, an example was shown in which the plunger 31 is provided separately from the axial portion 22, but an application of the present invention is not limited to such an example. Both members may be integrated with each other. In this case, for example, the axial portion 22 may be extended toward the solenoid 3 and a distal end side portion of the axial portion 22 may be used as a plunger.

In this embodiment, an example was shown in which the actuating portion for alternatively operating the emergency stop button 21 is provided on the side (i.e. back side) opposite the press side (i.e. direct operation side) of the emergency stop button 21, but an application of the present invention is not limited to such an example. For example, the actuating portion may be provided at an outer circumferential position such as a side portion, upper or lower portion and the like of the emergency stop button 21. That is, the actuating portion can be located at every position other than the press surface 21a and the inside thereof of the emergency stop button 21. In the specification of the present invention, such a position is generally expressed as a position other than the press surface 21a (i.e. a position different from the press surface 21a) of the emergency stop button 21.

In this embodiment, an emergency stop switch unit was taken as an example as an operation switch, but an application of the present invention was not limited to such an example and the present invention also has application to a press button switch other than the emergency stop switch. Also, a switch for handling discrete values may be used such as a selector switch that performs a speed control and the like by speed switching, a lever switch, a cam switch, a foot switch, and the like. Alternatively, a potentiometer (e.g. variable resistance, variable capacity, etc.) for handling continuous values such as volume may be used. Therefore, a signal transmitted from the transmission parts $41_1$, $41_2$ of the wireless terminal 4 (41, 42) includes not only a stop signal but also other operation signals. In addition, these switches may be remotely operated by radio using a solenoid and the like in terms of not only actuation but also reset of the operation switch.

In this embodiment, in case that the solenoid body 30 cannot draw the plunger 31 inwardly due to a contact welding or the like of the movable contact 23 and the fixed contact 24, a buzzer, a speaker or an indicating lamp may be installed in order to give notice to surrounding workers via voice or light. Also, a RFID (Radio Frequency Identification) tag may be used as a wireless terminal 4.

In this embodiment, an example was shown in which the solenoid 3 is employed as an actuating portion to actuate the emergency stop button 21, but an application of the present invention is not limited to such an example. A first to fourth alternative embodiments given below respectively show an example in which a mechanism other than the solenoid 3 as an actuating portion is employed. In these embodiments, like reference numbers indicate identical or functionally similar elements.

First Alternative Embodiment

Figure 7:
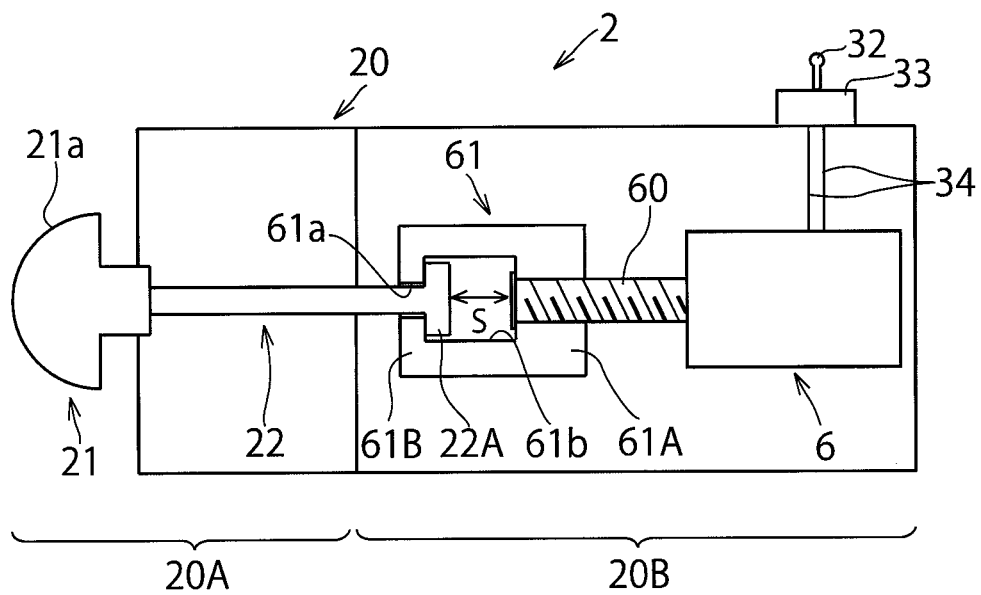
FIG. 7 illustrates a first alternative embodiment of the emergency stop switch unit of FIG. 4 showing the state of non-operation of the emergency stop switch unit.
Figure 7A:
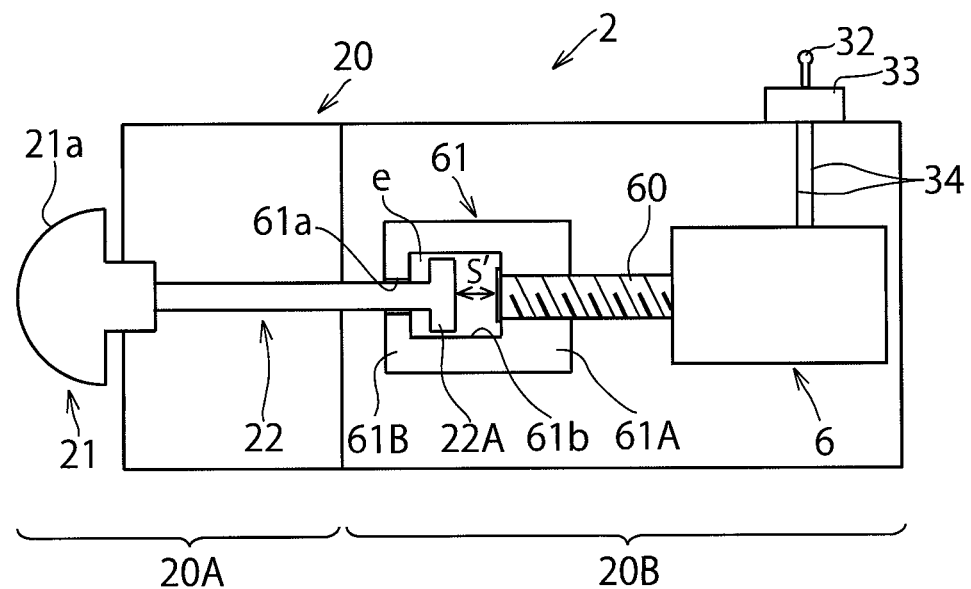
FIG. 7A illustrates a first alternative embodiment of the emergency stop switch unit of FIG. 5 showing the state of a direct operation (or a manual operation) of the emergency stop switch unit.
Figure 7B:
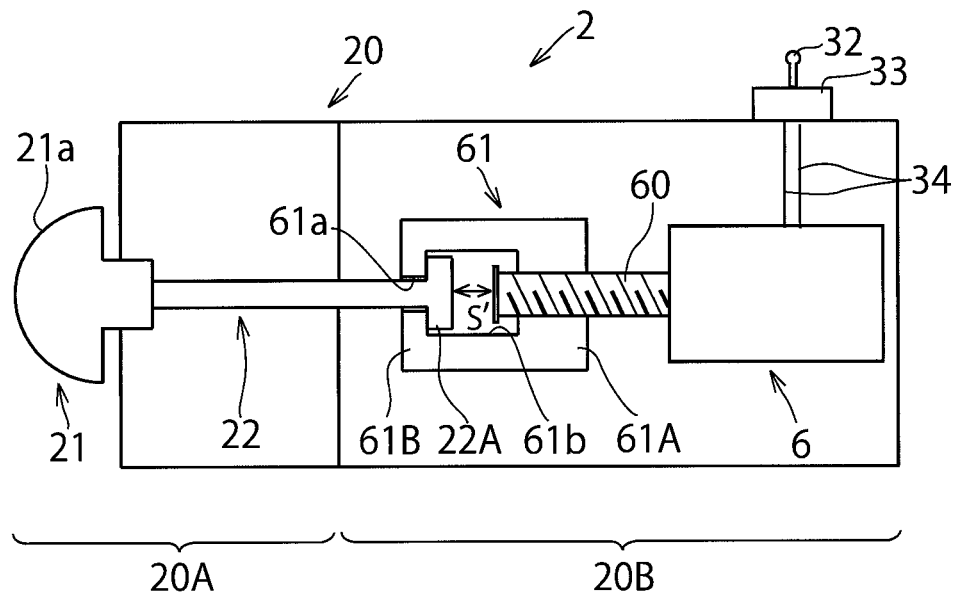
FIG. 7B illustrates a first alternative embodiment of the emergency stop switch unit of FIG. 5 showing the state of an alternative operation (or a remote operation) of the emergency stop switch unit.

FIGS. 7 to 7B show an emergency stop switch unit according to a first alternative embodiment of the present invention. FIG. 7 illustrates a state of non-operation of the emergency stop switch unit, FIG. 7A illustrates a state of direct operation of the emergency stop switch unit, and FIG. 7B illustrates a state of alternative operation of the emergency stop switch unit. In the drawings, a movable contact and a fixed contact are not shown.

In this first alternative embodiment, an electric cylinder is adopted in lieu of the solenoid 3 in the first embodiment. That is, a servomotor 6 having a ball screw as an output shaft is used. At a distal end of the ball screw 60, an end 61A of a cylindrical slider 61 is fitted. The end 61A of the slider 61 has a screw hole which a screw member of the ball screw is caused to be in screwing engagement with. The other end 61B of the slider 61 has a small through hole 61a which the axial portion 22 is inserted into. The engaged portion 22A at the distal end of the axial portion 22 is inserted into an interior 61b of the slider 61 to contact the other end 61B. By such a structure, drive of the servomotor 6 causes the ball screw 60 to rotate forwardly/reversely, such that thereby the slider 61 moves in a longitudinal direction (i.e. to the left/right in FIGS. 7A to 7C) along the axial direction.

The emergency stop switch unit 2 comprises a direct operation part 20A that includes an emergency stop button 21 and an axial portion 22 to directly operate the emergency stop button 21, and an alternative operation part 20B that includes the ball screw 60 and the servomotor 6 to alternatively operate the emergency stop button 21 in lieu of the direct operation part 20A. The alternative operation part 20B is adapted to be linked to the direct operation part 20A through the ball screw 60, the slider 61 and the engaged portion 22A of the axial portion 22. In addition, as with the above-mentioned embodiment, the direct operation part 20A and the alternative operation part 20B may be separable (That may be applied to other alternative embodiments). Also, similar to the above-mentioned embodiment, an extension unit may be added to the emergency stop switch unit 2 (That may be also applied to other alternative embodiments).

As shown in FIG. 7, in the state of non-operation of the emergency stop switch unit 2, the slider 61 is disposed at the distal end of the ball screw 60 and the engaged portion 22A at the distal end of the axial portion 22 contacts the other end 61B in the interior space 61b of the slider 61. At this juncture, there is formed a clearance S between the engaged portion 22A and the distal end of the ball screw 60. From this state, when the worker press-operates (or direct-operates) the emergency stop button 21 manually, the axial portion 22 along with the emergency stop button 21 is pressed inwardly, such that thereby the state shown in FIG. 7 is shifted to the state shown in FIG. 7A. At this time, the engaged portion 22A at the distal end of the axial portion 22 forms a gap e relative to the distal end 61B of the slider 61 and a clearance S' (<S) relative to the distal end of the ball screw 60. Thereby, a movable contact (not shown) moving along with the axial portion 22 opens relative to a fixed contact (not shown) to stop operation of an apparatus.

At the time of press operation of the emergency stop button 21, the engaged portion 22A at the distal end of the axial portion 22 moves in the interior space 61b of the slider 61. At this time, since a load on the side of the servomotor 6 does not occur, the movement of the axial portion 22 is carried out smoothly (i.e. without a load). Therefore, a press operation of the emergency stop switch unit 2 by the worker is possible exactly in the same manner as a press operation of a conventional emergency stop switch. In addition, when resetting the emergency stop button 21 to the state of non-operation, the worker grasps the emergency stop button 21 and pulls it (i.e. manually operate it). That may be applied to other alternative embodiments. In addition, regarding the resetting operation, by adopting a locking mechanism such as a push-lock and turn-reset mechanism, the locking state held by the internal locking mechanism at the time of push-operation of the emergency stop button 21 may be unlocked by turning the emergency stop button 21 (That may be also applied to other alternative embodiments).

In the state of non-operation shown in FIG. 7, when the wireless terminal transmits an operation signal, the operation signal is received by the reception part 32 of the alternative operation part 20B and inputted into the control circuit 33. A current is then supplied from the control circuit 33 to the servomotor 6 to cause the ball screw 60 to rotate forwardly. Then, as shown in FIG. 7B, the slider 61 in screwing engagement with the ball screw 60 moves rearwardly (i.e. to the right in FIG. 7B) along the ball screw 60. At this time, the engaged portion 22A at the distal end of the axial portion 22 contacting the other end 61B of the slider 61 also moves rearwardly. As a result, the movable contact (not shown) moving along with the axial portion 22 opens relative to the fixed contact (not shown) to stop operation of the apparatus.

In FIG. 7B, the emergency stop button 21 is in the pressed state by traveling along with the axial portion 22, such a state being exactly the same as a state of press-operation of the emergency stop button 21 by the worker. In addition, procedures in resetting the emergency stop button 21 to the state of non-operation are as follows:

Firstly, the servomotor 6 is rotated reversely to cause the slider 61 to move forwardly (i.e. to the left in FIG. 7B) along the ball screw 60; and Secondly, thereafter (see FIG. 7A), the worker grasps the emergency stop button 21 to pull it (i.e. operate it manually).

According to this first alternative embodiment, by the worker's manual press-operation (or direct-operation) of the emergency stop button 21 of the direct operation part 20A, the emergency stop button 21 is directly operated. Also, by a current supply to the servomotor 6 of the alternative operation part 20B, the emergency stop button 21 is alternatively operated through the ball screw 60 and the axial portion 22 in lieu of the direct operation part 20A. Thereby, both the direct operation and the alternative operation of the emergency stop button 21 can be achieved thus improving operability and safety. Moreover, an installation of the alternative operation part 20B does not hinder the direct operation of the emergency stop button 21. Thereby, not only the original switching function (or opening/closing operation, ON/OFF operation, etc.) as an operation switch can be achieved but also the requirements for an emergency stop function (see ISO 13850) required as an emergency stop switch are not impaired.

Also, the remote operation of the wireless terminal for the alternative operation part 20B is detected by the reception part 32 and the alternative operation part 20B is actuated based on the remote operation, that is, the emergency stop button 21 is pressed inwardly, such that thereby the emergency stop button 21 can be operated even at a place away from the emergency stop switch unit 2. Accordingly, even in the situation that the worker P cannot press the emergency stop button 21 directly, he/she can operate the emergency stop button 21 (i.e. perform an operation support of the emergency stop switch unit 2) thus further improving an operability and safety. Moreover, according to this first alternative embodiment, since the electric cylinder is disposed on the side opposite to a press side (or direct operation side) of the emergency stop button 21, that is, at a position other than the press surface 21a, the worker P can perform an alternative operation of the emergency stop button 21 without damaging operability at the time of performing the direct operation of the emergency stop button 21.

Second Alternative Embodiment

Figure 8:
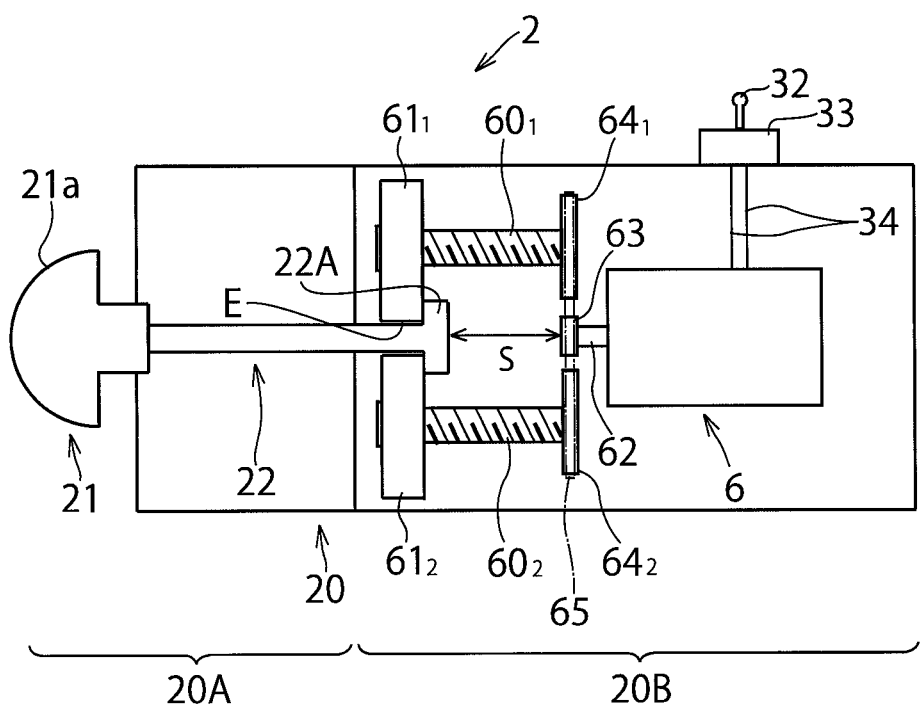
FIG. 8 illustrates a second alternative embodiment of the emergency stop switch unit of FIG. 4 showing the state of non-operation of the emergency stop switch unit.
Figure 8A:
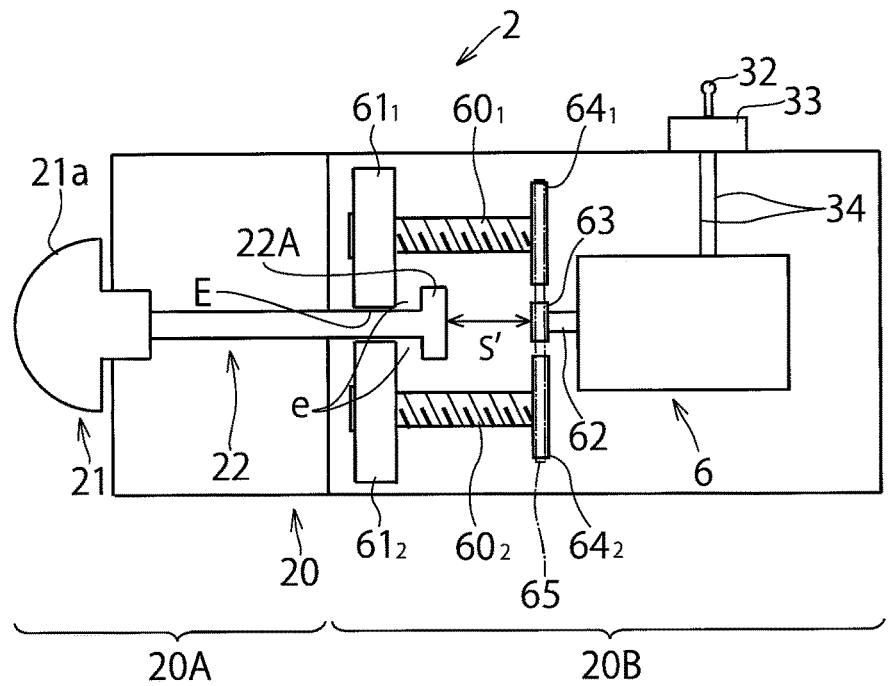
FIG. 8A illustrates a second alternative embodiment of the emergency stop switch unit of FIG. 5 showing the state of a direct operation (or a manual operation) of the emergency stop switch unit.
Figure 8B:
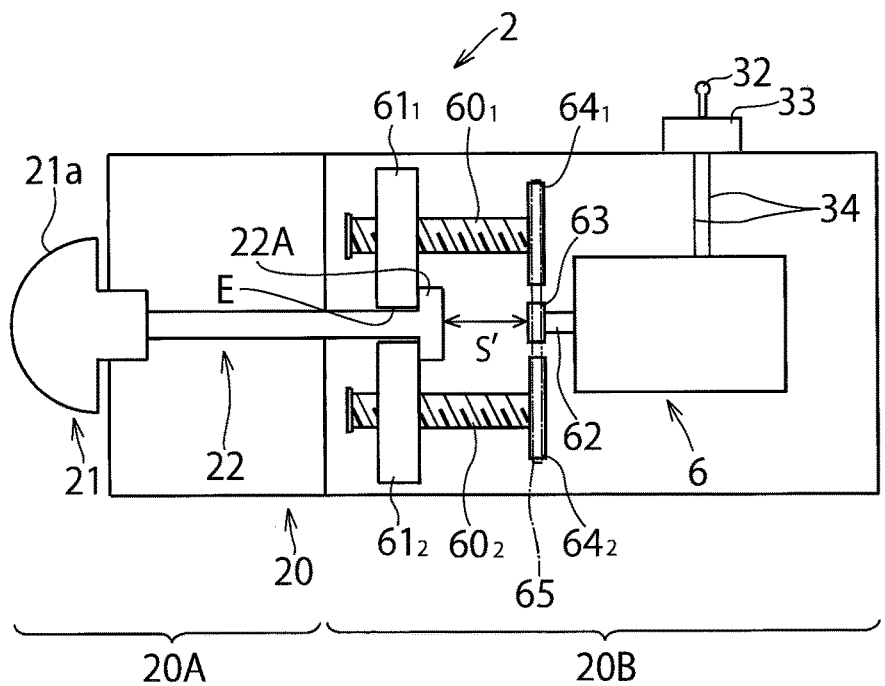
FIG. 8B illustrates a second alternative embodiment of the emergency stop switch unit of FIG. 5 showing the state of an alternative operation (or a remote operation) of the emergency stop switch unit.

FIGS. 8 to 8B show an emergency stop switch unit according to a second alternative embodiment of the present invention. FIG. 8 illustrates a state of non-operation of the emergency stop switch unit, FIG. 8A illustrates a state of direct operation of the emergency stop switch unit, and FIG. 8B illustrates a state of alternative operation of the emergency stop switch unit. In the drawings, a movable contact and a fixed contact are not shown.

In the above-mentioned first alternative embodiment, the electric cylinder was employed that comprises the servomotor 6 having the ball screw 60 at the output shaft, but in this second alternative embodiment, the ball screw is provided separately from the output shaft of the servomotor. As shown in FIG. 8, at an output shaft 62 of the servomotor 6, a timing gear 63 is fixedly attached. On both sides of the axial portion 22, a pair of ball screws $60_1$, $60_2$ are provided. At the rear ends (i.e. right-side end of FIG. 8) of the ball screws $60_1$, $60_2$, timing gears $64_1$, $64_2$ are fixedly attached. A timing belt 65 is wrapped around the timing gears 63, $64_1$, $64_2$. At the front ends (i.e. left-side end of FIG. 8) of the screws $60_1$, $60_2$, sliders $61_1$, $61_2$ are fixedly attached. The respective sliders $61_1$, $61_2$ have a screw hole (not shown) formed which the corresponding ball screws $60_1$, $60_2$ are screwed into. The sliders $61_1$, $61_2$ are oppositely disposed to each other at a clearance E and the axial portion 22 is inserted into the clearance E. The engaged portion 22A at the distal end of the axial portion 22 contacts the sliders $61_1$, $61_2$. By such a structure, a drive of the servomotor 6 causes the ball screws $60_1$, $60_2$ to rotate forwardly/reversely through the rotation of the timing belt 65, such that thereby the sliders $61_1$, $61_2$ move in the longitudinally direction (i.e. to the left/right in FIG. 8) along the axial direction of the ball screws $60_1$, $60_2$.

The emergency stop switch unit 2 comprises a direct operation part 20A that includes an emergency stop button 21 and the axial portion 22 to directly operate an emergency stop button 21, and an alternative operation part 20B that includes the ball screws $60_1$, $60_2$ and the servomotor 6 to alternatively operate the emergency stop button 21 in place of the direct operation part 20A. The alternative operation part 20B is adapted to be linked to the direct operation part 20A through the ball screws $60_1$, $60_2$, the sliders $61_1$, $61_2$ and the engaged portion 22A of the axial portion 22.

As shown in FIG. 8, in the state of non-operation of the emergency stop switch unit 2, the sliders $61_1$, $61_2$ are disposed at the distal ends of the corresponding ball screws $60_1$, $60_2$ and the engaged portion 22A at the distal end of the axial portion 22 contacts the sliders $61_1$, $61_2$. At this juncture, there is formed a clearance S between the engaged portion 22A and the output shaft 62 of the servomotor 6. From this state, when the worker press-operates (or direct-operates) the emergency stop button 21 manually, the axial portion 22 along with the emergency stop button 21 is pressed inwardly, such that thereby the state shown in FIG. 8 is shifted to the state shown in FIG. 8A. At this time, the engaged portion 22A at the distal end of the axial portion 22 forms a gape relative to the sliders $61_1$, $61_2$ and a clearance S' (<S) relative to the output shaft 62 of the servomotor 6. Thereby, a movable contact (not shown) moving along with the axial portion 22 opens relative to a fixed contact (not shown) to stop operation of an apparatus.

At the time of press operation of the emergency stop button 21, the axial portion 22 moves in the clearance E of the sliders $61_1$, $61_2$. At this time, since a load on the side of the ball screws $60_1$, $60_2$ and the servomotor 6 does not occur, the movement of the axial portion 22 is carried out smoothly (i.e. without a load). Therefore, a press operation of the emergency stop switch unit 2 by the worker is possible exactly in the same manner as a press operation of a conventional emergency stop switch.

In the state of non-operation shown in FIG. 8, when the wireless terminal transmits an operation signal, the operation signal is received by the reception part 32 of the alternative operation part 20B and inputted into the control circuit 33. A current is then supplied from the control circuit 33 to the servomotor 6 to cause the ball screws $60_1$, $60_2$ to rotate forwardly. Then, as shown in FIG. 8B, the sliders $61_1$, $61_2$ in screwing engagement with the respective ball screws $60_1$, $60_2$ move rearwardly (i.e. to the right in FIG. 8B) along the ball screws $60_1$, $60_2$. At this time, the engaged portion 22A at the distal end of the axial portion 22 contacting the sliders $61_1$, $61_2$ also moves rearwardly. As a result, a movable contact (not shown) moving along with the axial portion 22 opens relative to a fixed contact (not shown) to stop operation of the apparatus.

At this time, the emergency stop button 21 is in the pressed state by traveling along with the axial portion 22, such a state being exactly the same as a state of press-operation of the emergency stop button 21 by the worker. In addition, procedures in resetting the emergency stop button 21 to the state of non-operation are as follows:

Firstly, the servomotor 6 is rotated reversely to cause the sliders $61_1$, $61_2$ to move forwardly (i.e. to the left in FIG. 8B) along the corresponding ball screws $60_1$, 60; and Secondly, thereafter (see FIG. 8A), the worker grasps the emergency stop button 21 to pull it (i.e. operate it manually).

According to this second alternative embodiment, by the worker's manual press-operation (or direct-operation) of the emergency stop button 21 of the direct operation part 20A, the emergency stop button 21 is directly operated. Also, by a current supply to the servomotor 6 of the alternative operation part 20B, the emergency stop button 21 is alternatively operated through the ball screw $60_1$, $60_2$ and the axial portion 22 in place of the direct operation part 20A. Thereby, both the direct operation and the alternative operation of the emergency stop button 21 can be achieved thus improving operability and safety. Moreover, an installation of the alternative operation part 20B does not hinder a direct operation of the emergency stop button 21. Thereby, not only the original switching function (or opening/closing operation, ON/OFF operation, etc.) as an operation switch can be achieved but also the requirements for an emergency stop function (see ISO 13850) required as an emergency stop switch are not impaired.

Also, the remote operation of the wireless terminal for the alternative operation part 20B is detected by the reception part 32 and the alternative operation part 20B is actuated based on the remote operation, that is, the emergency stop button 21 is pressed inwardly, such that thereby the emergency stop button 21 can be operated even at a place away from the emergency stop switch unit 2. Accordingly, even in the situation that the worker P cannot press the emergency stop button 21 directly, he/she can operate the emergency stop button 21 (i.e. perform an operation support of the emergency stop switch unit 2) thus further improving operability and safety. Moreover, according to this second alternative embodiment, since the servomotor 6 and the ball screw $60_1$, $60_2$ are disposed on the side opposite to a press side (or direct operation side) of the emergency stop button 21, that is, at a position other than the press surface 21a, the worker P can perform an alternative operation of the emergency stop button 21 without damaging operability at the time of performing a direct operation of the emergency stop button 21.

Third Alternative Embodiment

Figure 9:
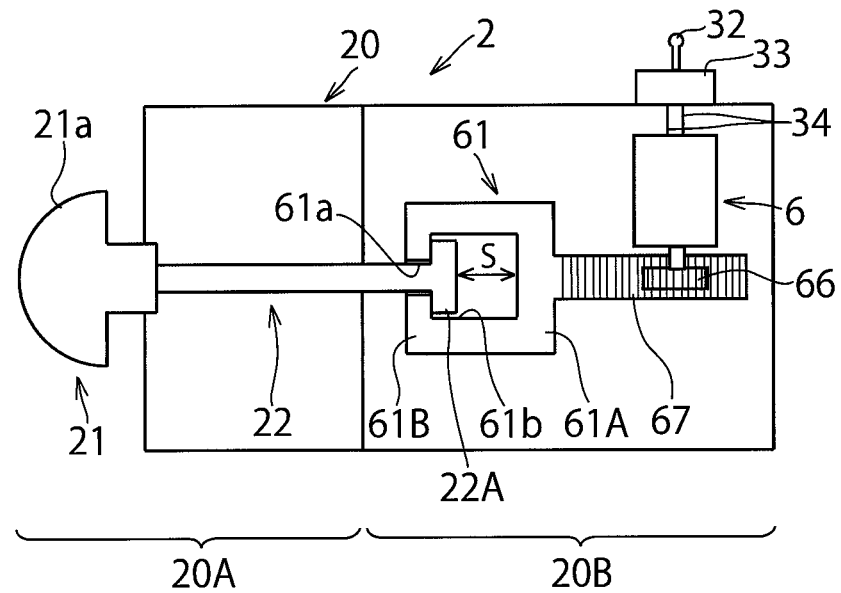
FIG. 9 illustrates a third alternative embodiment of the emergency stop switch unit of FIG. 4 showing the state of non-operation of the emergency stop switch unit.
Figure 9A:
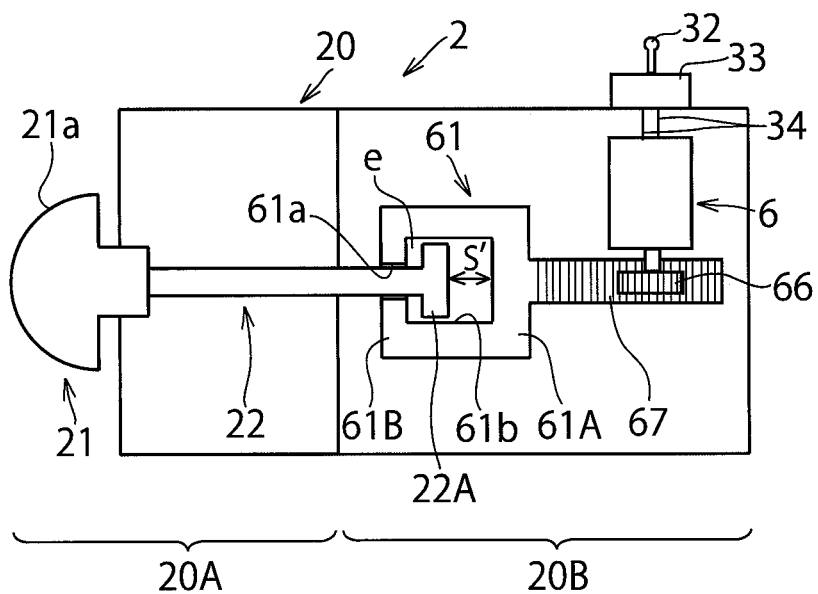
FIG. 9A illustrates a third alternative embodiment of the emergency stop switch unit of FIG. 5 showing the state of a direct operation (or a manual operation) of the emergency stop switch unit.
Figure 9B:
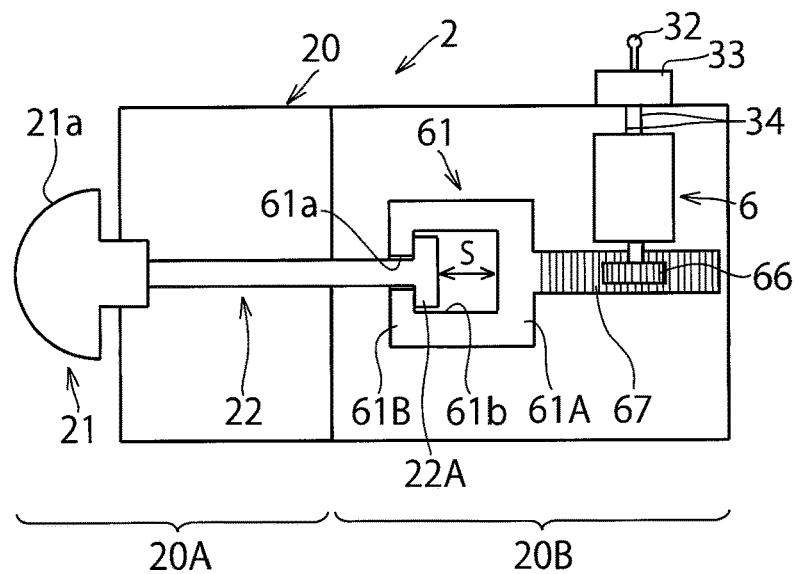
FIG. 9B illustrates a third alternative embodiment of the emergency stop switch unit of FIG. 5 showing the state of an alternative operation (or a remote operation) of the emergency stop switch unit.

FIGS. 9 to 9B show an emergency stop switch unit according to a third alternative embodiment of the present invention. FIG. 9 illustrates a state of non-operation of the emergency stop switch unit, FIG. 9A illustrates a state of direct operation of the emergency stop switch unit, and FIG. 9B illustrates a state of alternative operation of the emergency stop switch unit. In the drawings, a movable contact and a fixed contact are not shown.

In the above-mentioned first alternative embodiment, the electric cylinder was employed to move the slider 61, but in this third alternative embodiment, a rack and pinion mechanism is adopted. As show in FIG. 9, at an output shaft of the servomotor 6, a pinion 66 is fitted, which is in engagement with a rack 67 extending in the longitudinal direction (i.e. to the left to right in FIG. 9). A cylindrical slider 61 is fitted at a front end (i.e. at a left side end of FIG. 9) of the rack 67. The engaged portion 22A at the distal end of the axial portion 22 is inserted into the interior space 61b of the slider 61 to contact the other end 61B. By such a construction, rotation of the servomotor 6 causes the pinion 66 to rotate forwardly/rearwardly, such that thereby the slider 61 moves longitudinally in the axial direction via the rack 67.

The emergency stop switch unit 2 comprises a direct operation part 20A that includes an emergency stop button 21 and the axial portion 22 to directly operate the emergency stop button 21, and an alternative operation part 20B that includes the pinion 66, the rack 67 and the servomotor 6 to alternatively operate the emergency stop button 21 in place of the direct operation part 20A. The alternative operation part 20B is adapted to be linked to the direct operation part 20A through the pinion 66, the rack 67, the slider 61 and the engaged portion 22A of the axial portion 22.

As shown in FIG. 9, in the state of non-operation of the emergency stop switch unit 2, the engaged portion 22A at the distal end of the axial portion 22 is in contact with the other end 61B of the slider 61 in the interior space 61b. At this juncture, there is formed a clearance S between the engaged portion 22A and the end 61A of the slider 61. From this state, when the worker press-operates (or direct-operates) the emergency stop button 21 manually, the axial portion 22 along with the emergency stop button 21 is pressed inwardly, such that thereby the state shown in FIG. 9 is shifted to the state shown in FIG. 9A. At this time, the engaged portion 22A at the distal end of the axial portion 22 forms a gap e relative to the other end 61B of the slider 61 and a clearance S' (<S) relative to the other end 61A of the slider 61. Thereby, a movable contact (not shown) moving along with the axial portion 22 opens relative to a fixed contact (not shown) to stop operation of an apparatus.

At the time of press operation of the emergency stop button 21, the engaged portion 22A at the distal end of the axial portion 22 moves in the interior space 61b of the slider 61. At this time, since a load on the side of the servomotor 6 does not occur, the movement of the axial portion 22 is carried out smoothly (i.e. without a load). Therefore, a press operation of the emergency stop switch unit 2 by the worker is possible exactly in the same manner as a press operation of a conventional emergency stop switch.

In the state of non-operation shown in FIG. 9, when the wireless terminal transmits an operation signal, the operation signal is received by the reception part 32 of the alternative operation part 20B and inputted into the control circuit 33. A current is then supplied from the control circuit 33 to the servomotor 6 to cause the pinion 66 to rotate forwardly. Then, as shown in FIG. 9B, the slider 61 moves rearwardly (i.e. to the right in FIG. 7B) through the rack 67. At this time, the engaged portion 22A at the distal end of the axial portion 22 contacting the other end 61B of the slider 61 also moves rearwardly. As a result, the movable contact (not shown) moving along with the axial portion 22 opens relative to the fixed contact (not shown) to stop operation of the apparatus.

In FIG. 9B, the emergency stop button 21 is in the pressed state by traveling along with the axial portion 22, such a state being exactly the same as a state of press-operation of the emergency stop button 21 by the worker. In addition, procedures in resetting the emergency stop button 21 to the state of non-operation are as follows:

Firstly, the servomotor 6 is driven to rotate the pinion 66 reversely to cause the slider 61 to move forwardly (i.e. to the left in FIG. 9B); and Secondly, thereafter (see FIG. 9A), the worker grasps the emergency stop button 21 to pull it (i.e. operate it manually).

According to this third alternative embodiment, by the worker's manual press-operation (or direct-operation) of the emergency stop button 21 of the direct operation part 20A, the emergency stop button 21 is directly operated. Also, by a current supply to the servomotor 6 of the alternative operation part 20B, the emergency stop button 21 is alternatively operated through the pinion 66, the rack 67 and the axial portion 22 in place of the direct operation part 20A. Thereby, both the direct operation and the alternative operation of the emergency stop button 21 can be achieved thus improving operability and safety. Moreover, an installation of the alternative operation part 20B does not hinder a direct operation of the emergency stop button 21. Thereby, not only the original switching function (or opening/closing operation, ON/OFF operation, etc.) as an operation switch can be achieved but also the requirements for an emergency stop function (see ISO 13850) required as an emergency stop switch are not impaired.

Also, the remote operation of the wireless terminal for the alternative operation part 20B is detected by the reception part 32 and the alternative operation part 20B is actuated based on the remote operation, that is, the emergency stop button 21 is pressed inwardly, such that thereby the emergency stop button 21 can be operated even at a place away from the emergency stop switch unit 2. Accordingly, even in the situation that the worker P cannot press the emergency stop button 21 directly, he/she can operate the emergency stop button 21 (i.e. perform an operation support of the emergency stop switch unit 2) thus further improving an operability and safety. Moreover, according to this third alternative embodiment, since the servomotor 6, the pinion 66 and the rack 67 are disposed on the side opposite to a press side (or direct operation side) of the emergency stop button 21, that is, at a position other than the press surface 21a, the worker P can perform an alternative operation of the emergency stop button 21 without damaging operability at the time of performing a direct operation of the emergency stop button 21.

Fourth Alternative Embodiment

Figure 10:
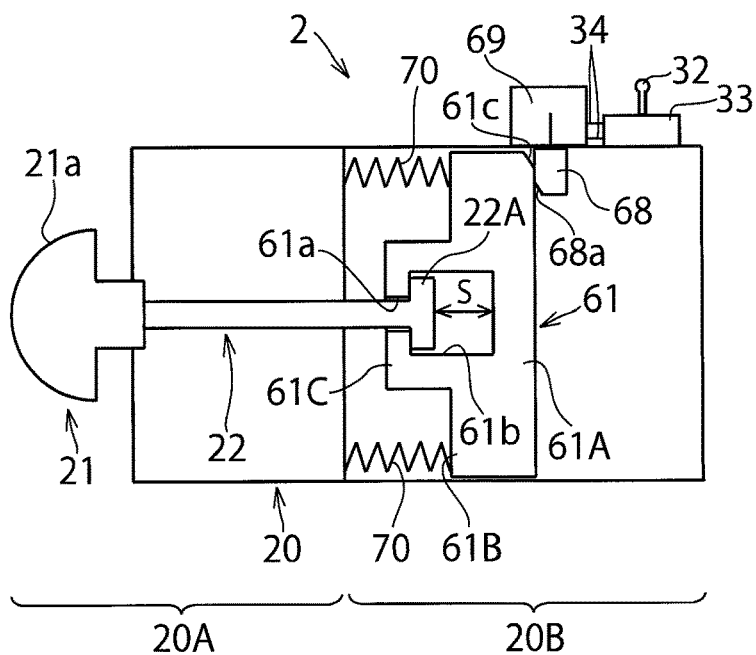
FIG. 10 illustrates a fourth alternative embodiment of the emergency stop switch unit of FIG. 4 showing the state of non-operation of the emergency stop switch unit.
Figure 10A:
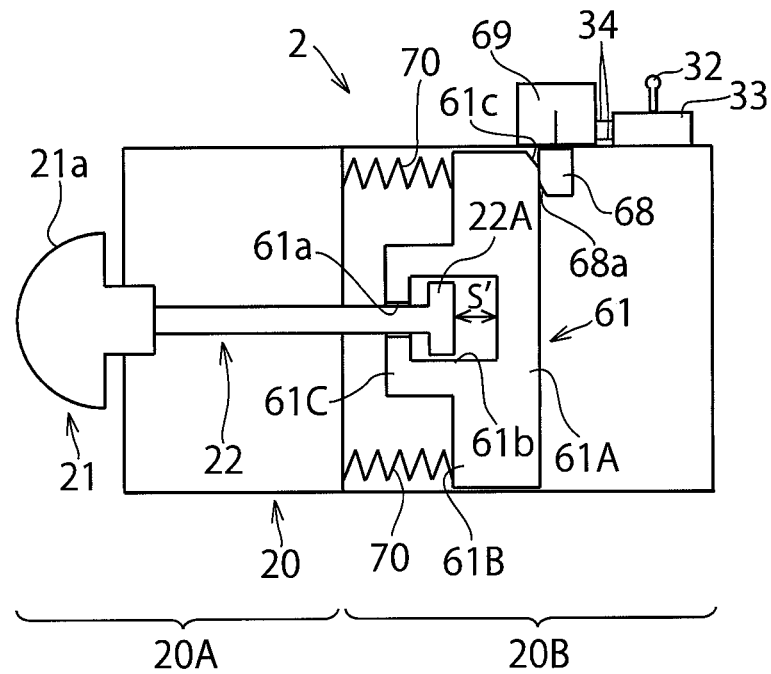
FIG. 10A illustrates a fourth alternative embodiment of the emergency stop switch unit of FIG. 5 showing the state of a direct operation (or a manual operation) of the emergency stop switch unit.
Figure 10B:
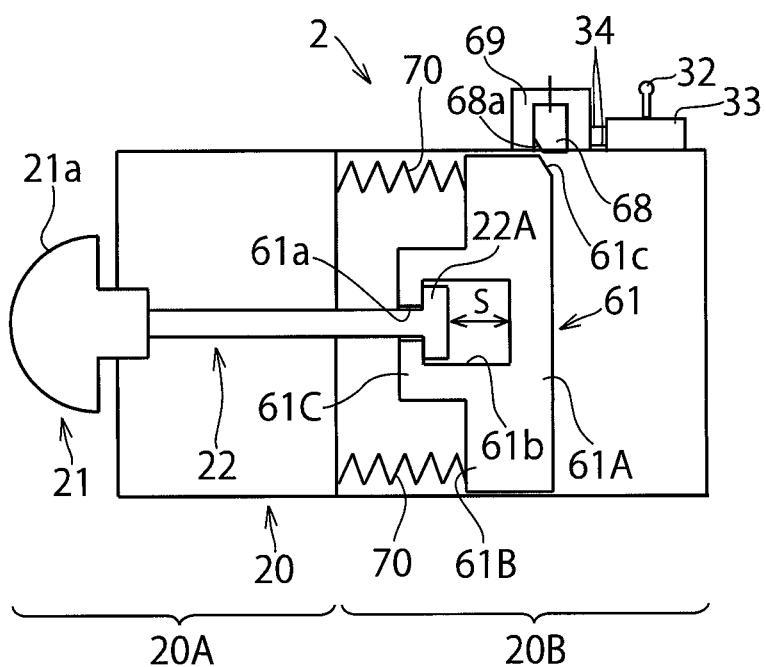
FIG. 10B illustrates a fourth alternative embodiment of the emergency stop switch unit of FIG. 5 showing the state of an alternative operation (or a remote operation) of the emergency stop switch unit.

FIGS. 10 to 10B show an emergency stop switch unit according to a fourth alternative embodiment of the present invention. FIG. 10 illustrates a state of non-operation of the emergency stop switch unit, FIG. 10A illustrates a state of direct operation of the emergency stop switch unit, and FIG. 10B illustrates a state of alternative operation of the emergency stop switch unit. In the drawings, a movable contact and a fixed contact are not shown.

In this fourth alternative embodiment, a mechanism composed of a compression spring and a stopper is employed to move the slider 61. As shown in FIG. 10, a cylindrical slider 61 is slidable longitudinally (i.e. to the left to right direction in FIG. 10) in the case 20. A stopper 68 is in contact with an end 61A of the slider 61. The stopper 68 is provided movably to take a locking position (FIGS. 10, 10A) for contacting the end 61A of the slider 61 to lock the slider 61 and an unlocking position (FIG. 10B) for moving away from the end 61A of the slider 61 to unlock a locking state of the slider 61. An inclined surface 61c is formed at a corner of the end 61A of the slider 61 in the vicinity of the stopper 68. At a distal end of the stopper 68, an inclined surface 68a is formed that corresponds to the inclined surface 61c of the slider 61. Outside the case 20, an actuator 69 is provided to actuate the stopper 68. The actuator 69 is structured in such a way as to combine a motor with a rack and pinion or a cylinder with a link mechanism, alternatively, to use a solenoid and the like. The actuator 69 is connected to the control circuit 33 via a lead wire 34.

Respective ends of a plurality of longitudinally extending compression springs 70 are fitted to the other end 61B of the slider 61. The other ends of the compression springs 70 are pressed against an inner wall surface of the case 20. Thereby, repulsion forces of the respective compression springs 70 act on the slider 61 disposed at the locking position (FIG. 10, 10A). The slider 61 has a boss part 61C provided centrally at the other end 61B thereof. The boss part 61C has a small through hole 61a formed which the axial portion 22 is inserted into. The engaged portion 22A at the distal end of the axial portion 22 is disposed inside the interior space 61b of the slider 61 and contacted by the boss part 61C.

The emergency stop switch unit 2 comprises a direct operation part 20A that includes an emergency stop button 21 and the axial portion 22 to directly operate the emergency stop button 21, and an alternative operation part 20B that includes the stopper 68, the compression springs 70 and the actuator 69 to alternatively operate the emergency stop button 21 in place of the direct operation part 20A. The alternative operation part 20B is adapted to be linked to the direct operation part 20A through the slider 61 and the engaged portion 22A of the axial portion 22.

As shown in FIG. 10, in the state of non-operation of the emergency stop switch unit 2, the stopper 68 disposed at the locking position is in contact with the end 61A of the slider 61. The engaged portion 22A at the distal end of the axial portion 22 is in contact with the boss part 61C of the slider 61 in the interior space 61b of the slider 61. At this juncture, there is formed a clearance S between the engaged portion 22A and the end 61A of the slider 61. From this state, when the worker press-operates (or direct-operates) the emergency stop button 21 manually, the axial portion 22 along with the emergency stop button 21 is pressed inwardly, such that thereby the state shown in FIG. 10 is shifted to the state shown in FIG. 10A. At this time, the engaged portion 22A at the distal end of the axial portion 22 forms a gap e relative to the boss part 61C of the slider 61 and a clearance S' (<S) relative to the end 61A of the slider 61. Thereby, a movable contact (not shown) moving along with the axial portion 22 moves away from and opens relative to a fixed contact (not shown) to stop operation of an apparatus.

At the time of press operation of the emergency stop button 21, the engaged portion 22A at the distal end of the axial portion 22 moves in the interior space 61b of the slider 61. At this time, since the elastic repulsions of the compression springs 70 do not act, the movement of the axial portion 22 is carried out smoothly (i.e. without a load). Therefore, the press operation of the emergency stop switch unit 2 by the worker is possible exactly in the same manner as a press operation of a conventional emergency stop switch.

In the state of non-operation shown in FIG. 10, when the wireless terminal transmits an operation signal, the operation signal is received by the reception part 32 of the alternative operation part 20B and inputted into the control circuit 33. A current is then supplied from the control circuit 33 to the actuator 69 to drive it, thereby moving the stopper 68 from the locking position to the unlocking position (see FIG. 10B). Then, as shown in FIG. 10B, due to the action of the elastic repulsion of the compression spring 70, the slider 61 moves rearwardly (i.e. to the right in FIG. 7B). At this time, the engaged portion 22A at the distal end of the axial portion 22 contacting the boss part 61C of the slider 61 also moves rearwardly. As a result, the movable contact (not shown) moving along with the axial portion 22 opens relative to the fixed contact (not shown) to stop operation of the apparatus. At this juncture, as shown in FIG. 10B, the inclined surface 68a of the stopper 68 is disposed opposite the inclined surface 61c of the slider 61.

In FIG. 10B, the emergency stop button 21 is in the pressed state by traveling along with the axial portion 22, such a state being exactly the same as a state of press-operation of the emergency stop button 21 by the worker. In addition, procedures in resetting the emergency stop button 21 to the state of non-operation are as follows:

Firstly, the actuator 69 is driven to cause the stopper 68 to move from the unlocking position to the locking position;

At this time, the stopper 68 moves with the inclined surface 68a pressed against the inclined surface 61c of the slider 61 and as the travel of the stopper 68 the slider 61 gradually moves forwardly (i.e. to the left in FIG. 10B); and Secondly, after the stopper 68 has moved to the locking position (see FIG. 10A), the worker grasps the emergency stop button 21 to pull it (i.e. operate it manually), thus returning the emergency stop button 21 to the original position.

According to this fourth alternative embodiment, by the worker's manual press-operation (or direct-operation) of the emergency stop button 21 of the direct operation part 20A, the emergency stop button 21 is directly operated. Also, the emergency stop button 21 is alternatively operated through the stopper 68, the compression spring 70 and the axial portion 22 in place of the direct operation part 20A. Thereby, both the direct operation and the alternative operation of the emergency stop button 21 can be achieved thus improving operability and safety. Moreover, an installation of the alternative operation part 20B does not hinder the direct operation of the emergency stop button 21. Thereby, not only the original switching function (or opening/closing operation, ON/OFF operation, etc.) as an operation switch can be achieved but also the requirements for an emergency stop function (see ISO 13850) required as an emergency stop switch are not impaired.

Also, the remote operation of the wireless terminal for the alternative operation part 20B is detected by the reception part 32 and the alternative operation part 20B is actuated based on the remote operation, that is, the emergency stop button 21 is pressed inwardly, such that thereby the emergency stop button 21 can be operated even at a place away from the emergency stop switch unit 2. Accordingly, even in the situation that the worker P cannot press the emergency stop button 21 directly, he/she can operate the emergency stop button 21 (i.e. perform an operation support of the emergency stop switch unit 2) thus further improving operability and safety. Moreover, according to this fourth alternative embodiment, since the stopper 68 and the compression coil spring 70 are disposed on the side opposite to a press side (or direct operation side) of the emergency stop button 21, that is, at a position other than the press surface 21a, the worker can perform an alternative operation of the emergency stop button 21 without damaging operability at the time of performing the direct operation of the emergency stop button 21.

Fifth Alternative Embodiment

Figure 11:
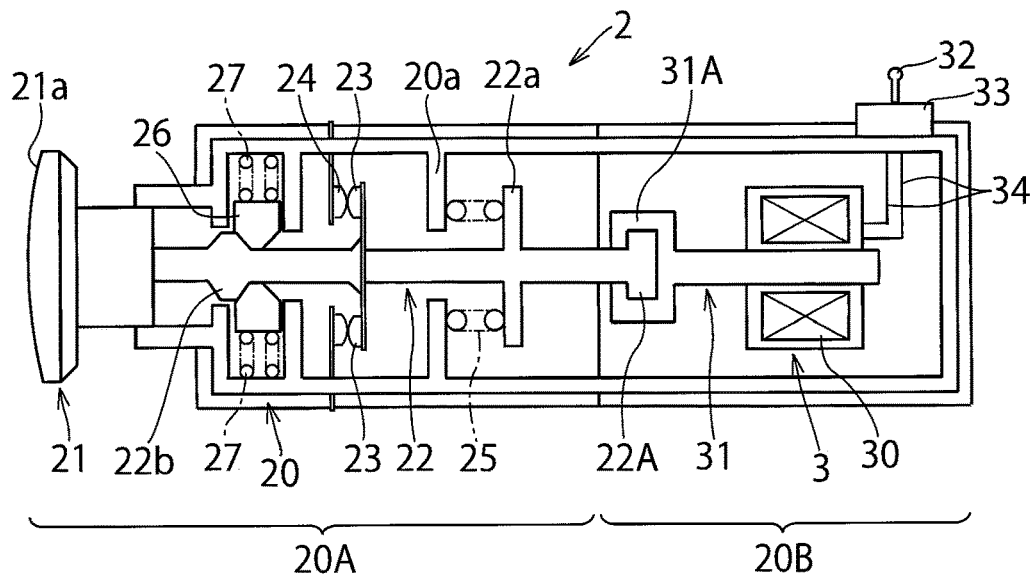
FIG. 11 illustrates a fifth alternative embodiment of the emergency stop switch unit of FIG. 4 showing the state of non-operation of the emergency stop switch unit.
Figure 12:
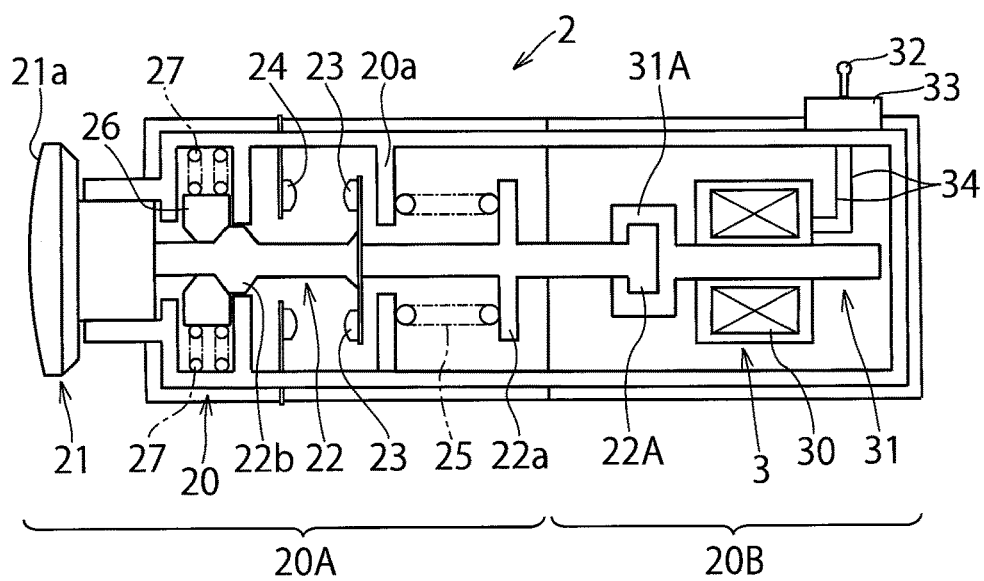
FIG. 12 illustrates a fifth alternative embodiment of the emergency stop switch unit of FIG. 5 showing the state of a direct operation (or a manual operation) and an alternative operation (or a remote operation) of the emergency stop switch unit.

FIGS. 11 and 12 show an emergency stop switch unit according to a fifth alternative embodiment of the present invention. FIG. 11 illustrates a state of non-operation of the emergency stop switch unit, and FIG. 12 illustrates a state of alternative operation of the emergency stop switch unit. In the drawings, like reference numbers indicate identical or functionally similar elements to those in the above-mentioned embodiment.

As shown in FIGS. 11 and 12, in this fifth alternative embodiment, the flange part 22a projecting radially outwardly from the axial portion 22 is disposed at the rear (i.e. to the right in the drawings) of the movable contact 23. In the same manner, the projecting part 20a extending radially inwardly from the inner wall surface of the case 20 is disposed at the rear of the movable contact 23. The flange part 22a and the projecting part 20a are disposed opposite to each other. The coil spring 25 is in a compressed state in an axial space between the projecting part 20a and the flange part 22a. An end of the coil spring 25 contacts and engages with the flange part 22a, and the other end of the coil spring 25 contacts the projecting part 20a to engage with the case 20. The coil spring 25 imparts an elastic repulsion (or biasing force) to the projecting part 20a and the flange part 22a. Such an elastic repulsion biases the movable contact 23 away from the fixed contact 24, that is, in a contact-opening direction i.e. to the right side of FIGS. 11 and 12.

The effects of the invention of this fifth alternative embodiment are similar to those of the above-mentioned embodiment. Moreover, in this case, the coil spring is disposed at a position near the distal end of the axial portion 22 thus relatively facilitating maintenance such as a replacement of the coil spring 25.

Sixth Alternative Embodiment

Figure 13:
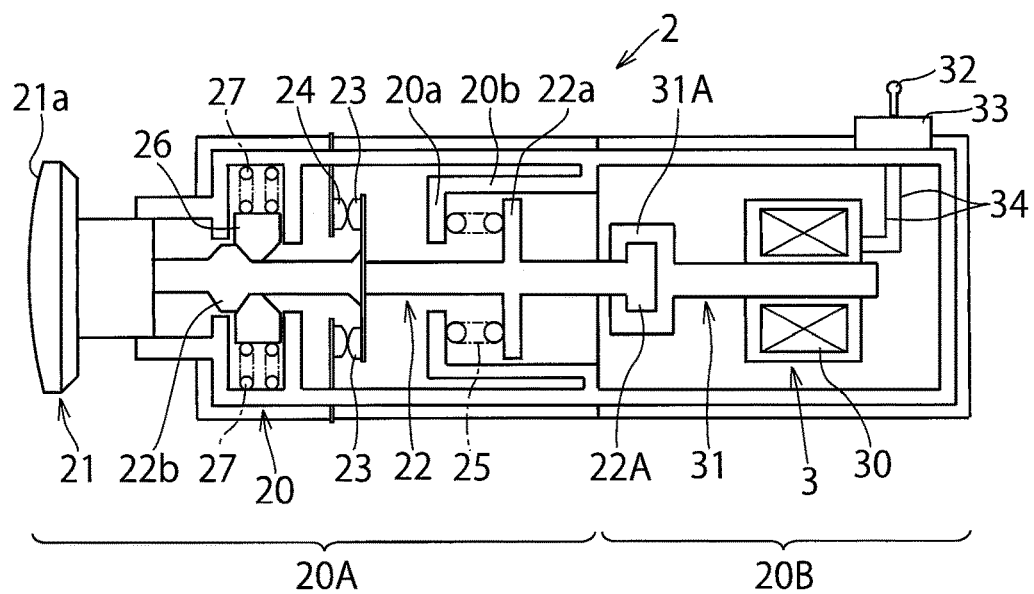
FIG. 13 illustrates a sixth alternative embodiment of the emergency stop switch unit of FIG. 4 showing the state of non-operation of the emergency stop switch unit.
Figure 14:
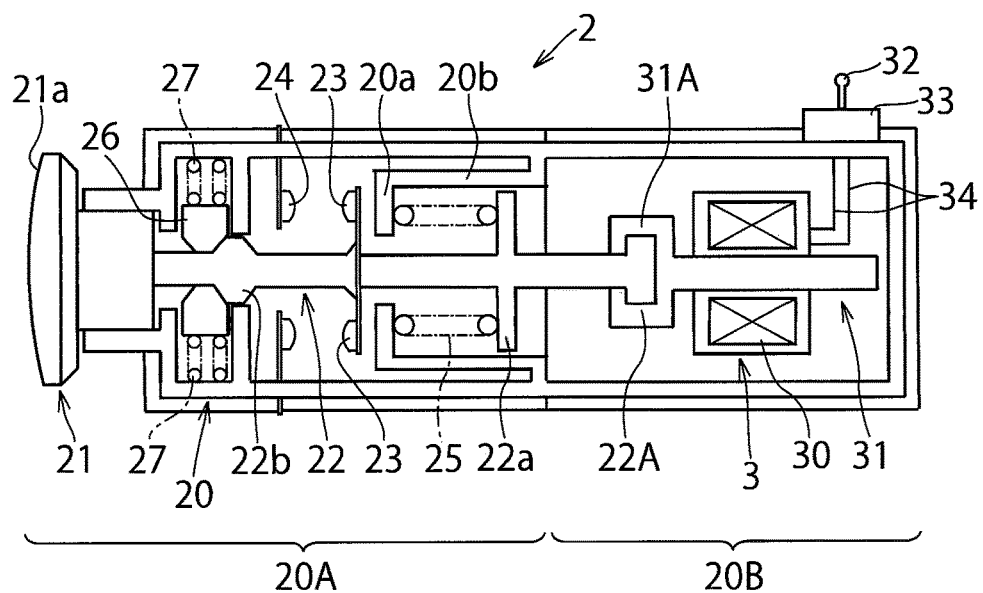
FIG. 14 illustrates a sixth alternative embodiment of the emergency stop switch unit of FIG. 5 showing the state of a direct operation (or a manual operation) and an alternative operation (or a remote operation) of the emergency stop switch unit.
Figure 15:
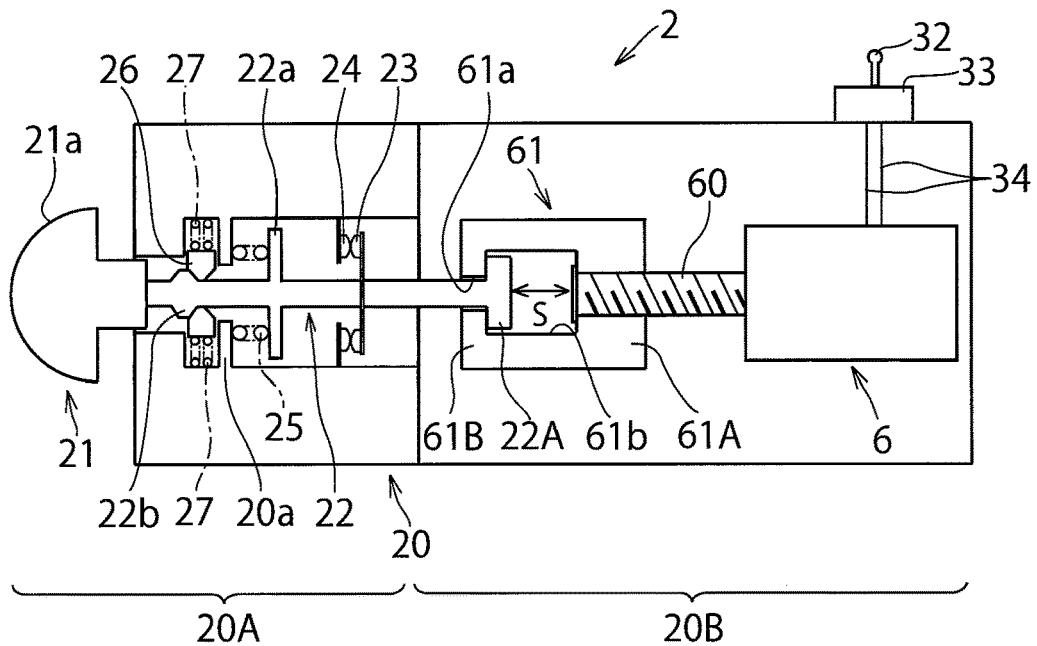
FIG. 15 illustrates an example of an internal structure of the emergency stop switch unit of FIG. 7 showing the state of non-operation of the emergency stop switch.
Figure 15A:
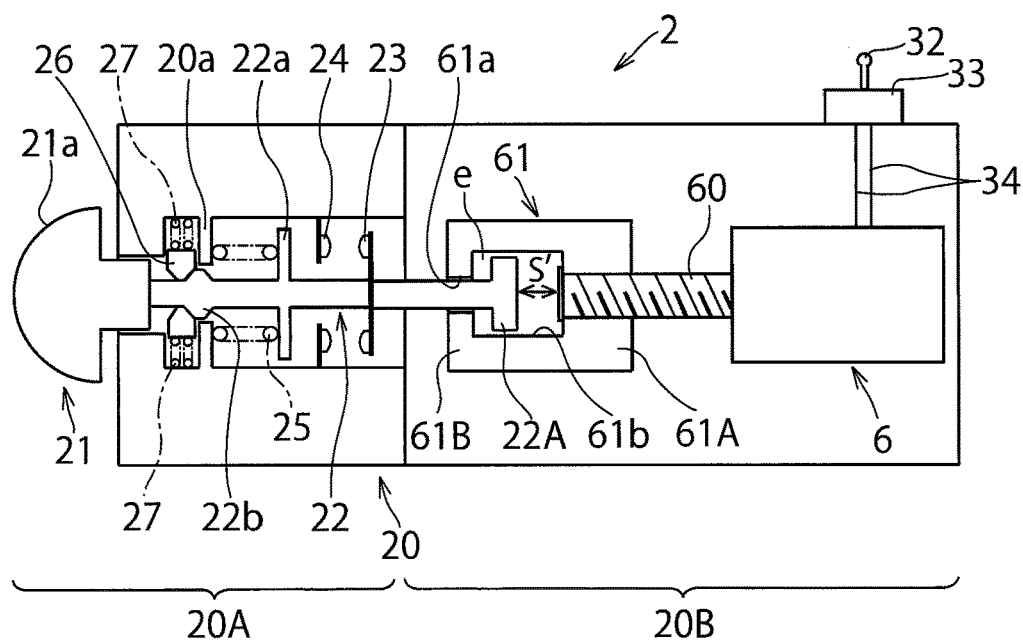
FIG. 15A illustrates an example of an internal structure of the emergency stop switch unit of FIG. 7A showing the state of a direct operation (or a manual operation) of the emergency stop switch.
Figure 15B:
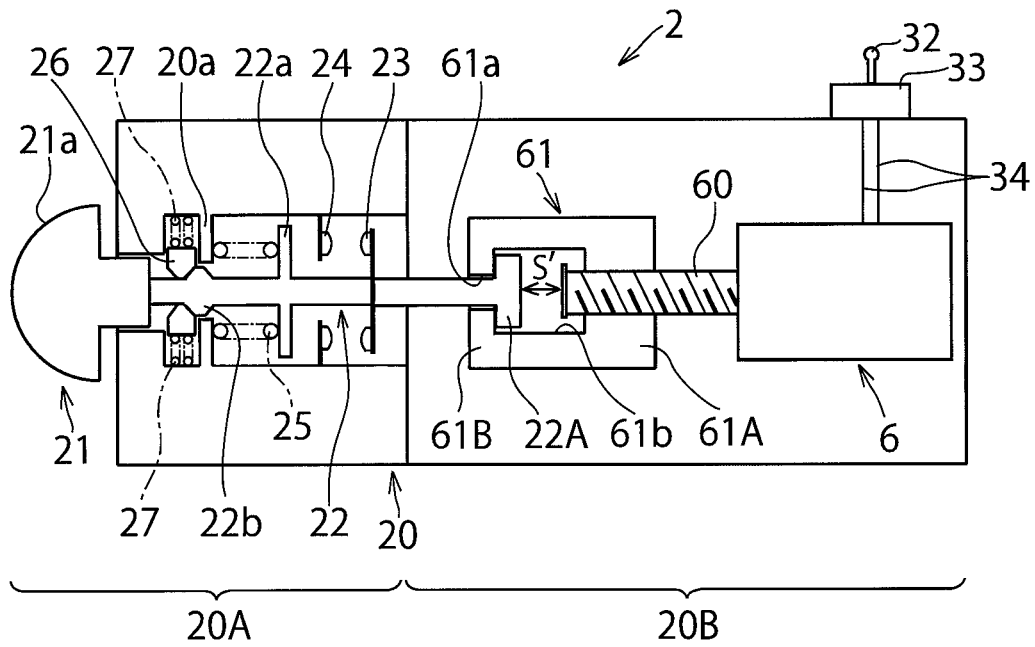
FIG. 15B illustrates an example of an internal structure of the emergency stop switch unit of FIG. 7B showing the state of an alternative operation (or a remote operation) of the emergency stop switch.
Figure 16:
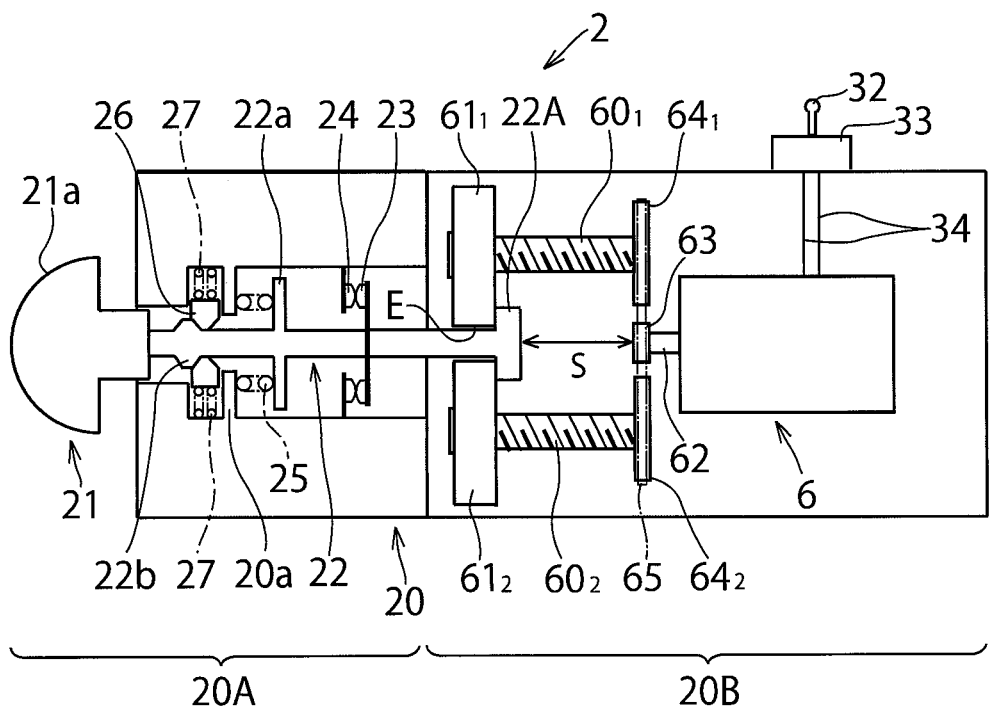
FIG. 16 illustrates an example of an internal structure of the emergency stop switch unit of FIG. 8 showing the state of non-operation of the emergency stop switch.
Figure 16A:
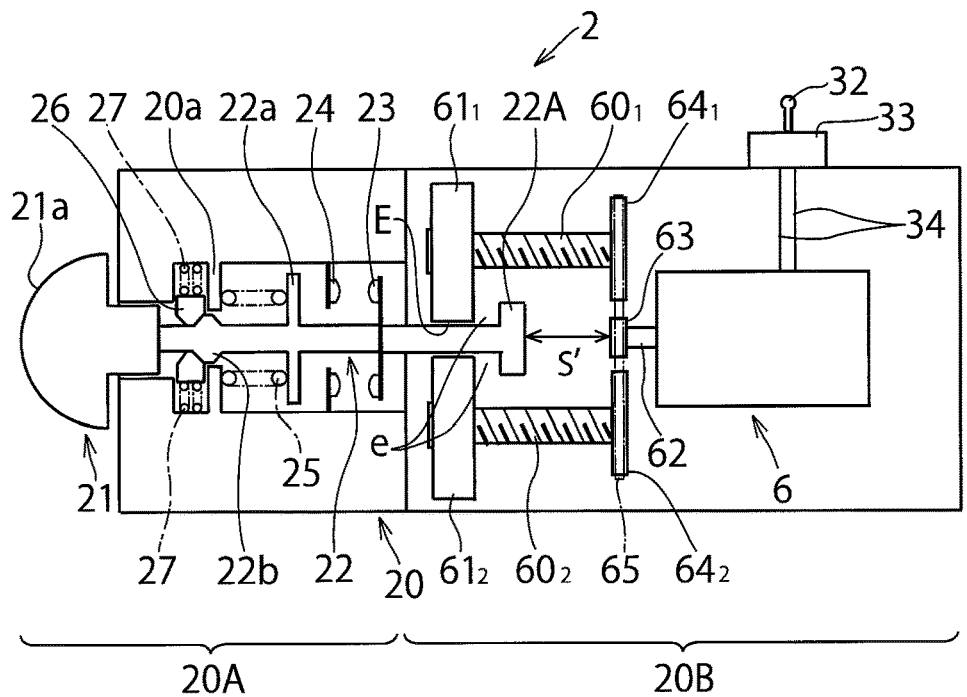
FIG. 16A illustrates an example of an internal structure of the emergency stop switch unit of FIG. 8A showing the state of a direct operation (or a manual operation) of the emergency stop switch.
Figure 16B:
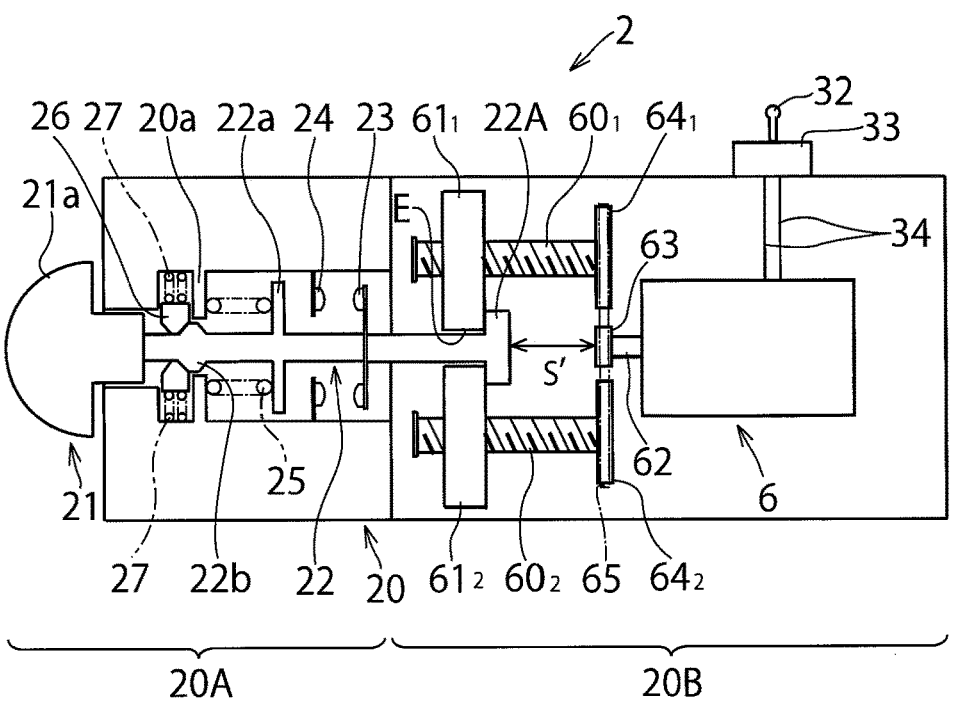
FIG. 16B illustrates an example of an internal structure of the emergency stop switch unit of FIG. 8B showing the state of an alternative operation (or a remote operation) of the emergency stop switch.
Figure 17:
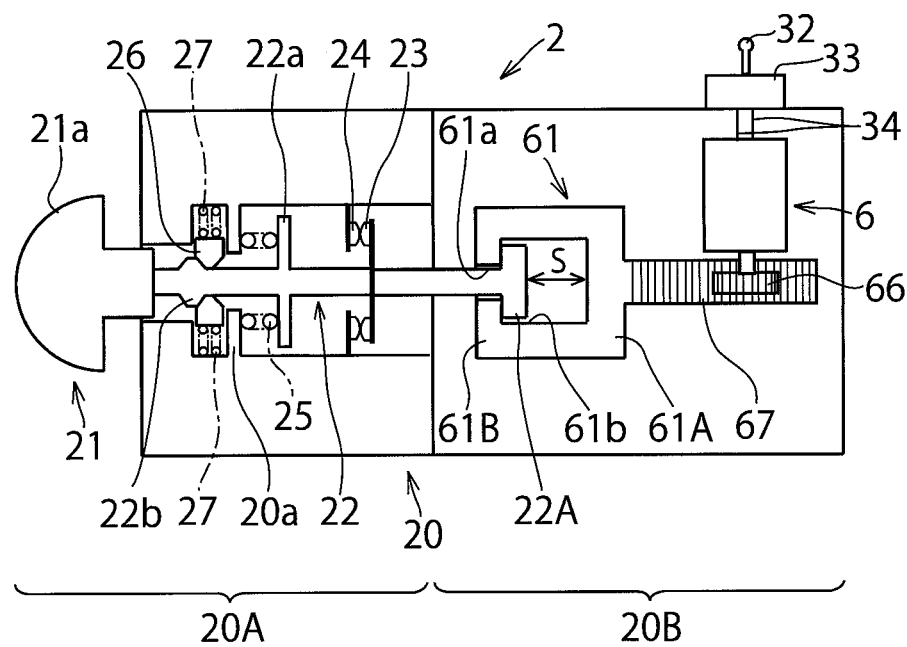
FIG. 17 illustrates an example of an internal structure of the emergency stop switch unit of FIG. 9 showing the state of non-operation of the emergency stop switch.
Figure 17A:
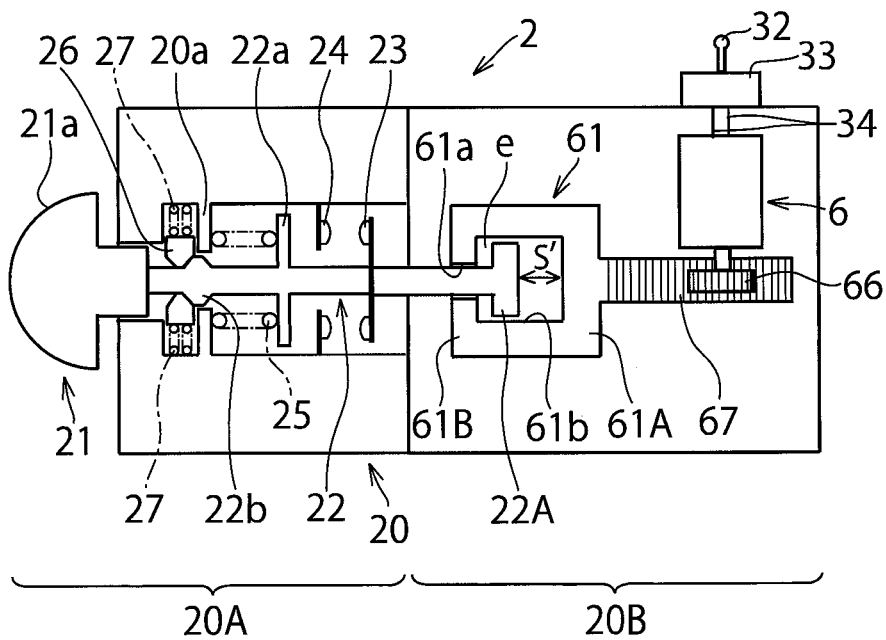
FIG. 17A illustrates an example of an internal structure of the emergency stop switch unit of FIG. 9A showing the state of a direct operation (or a manual operation) of the emergency stop switch.
Figure 17B:
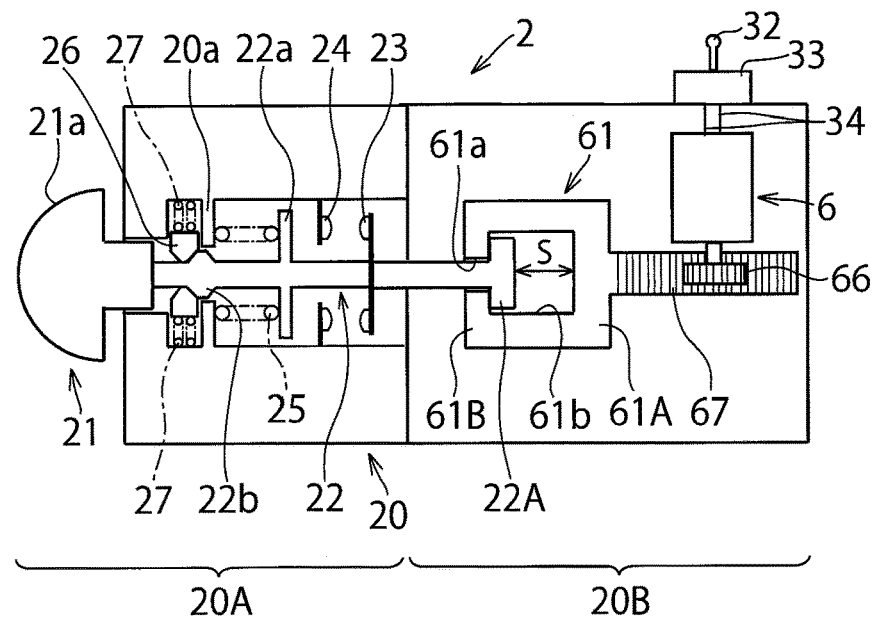
FIG. 17B illustrates an example of an internal structure of the emergency stop switch unit of FIG. 9B showing the state of an alternative operation (or a remote operation) of the emergency stop switch.
Figure 18:
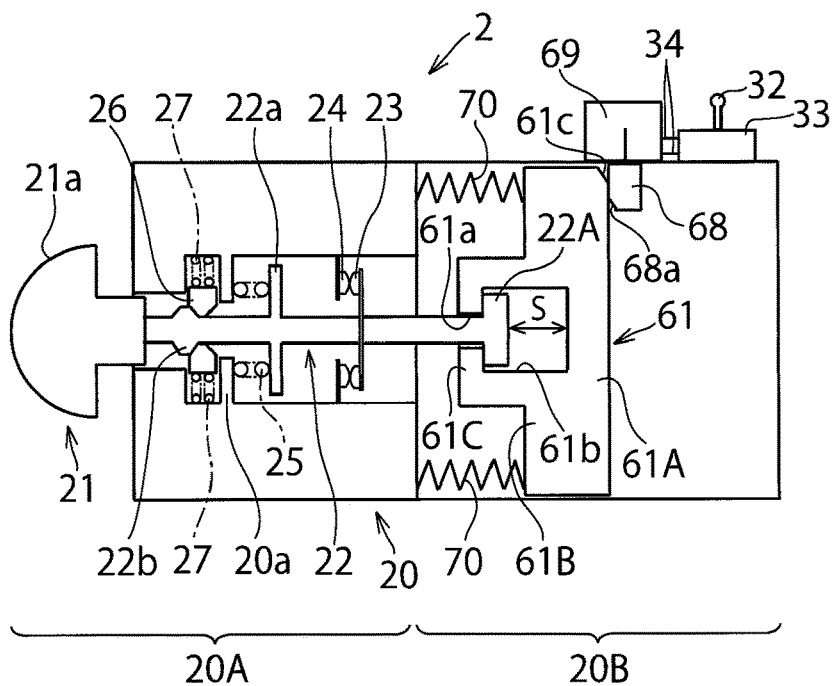
FIG. 18 illustrates an example of an internal structure of the emergency stop switch unit of FIG. 10 showing the state of non-operation of the emergency stop switch.
Figure 18A:
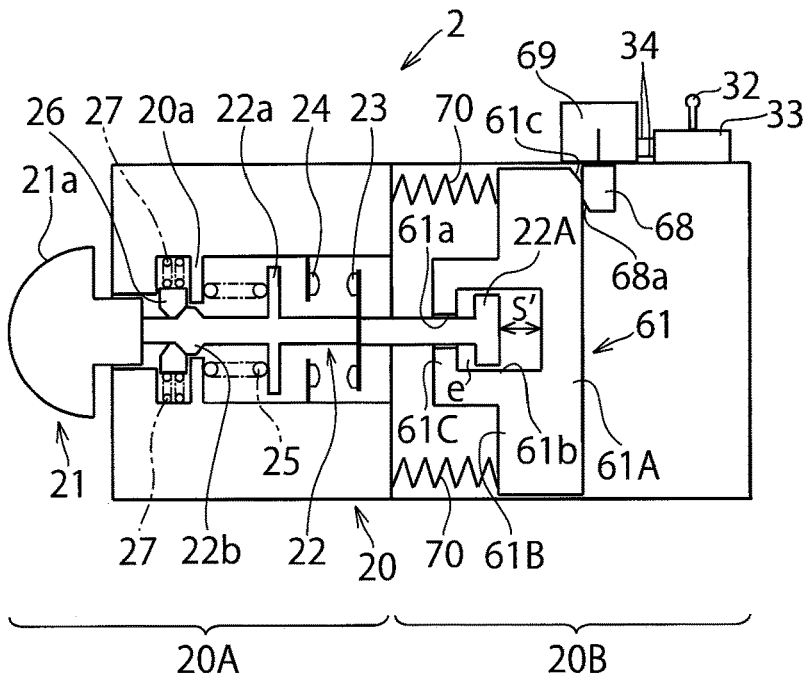
FIG. 18A illustrates an example of an internal structure of the emergency stop switch unit of FIG. 10A showing the state of a direct operation (or a manual operation) of the emergency stop switch.
Figure 18B:
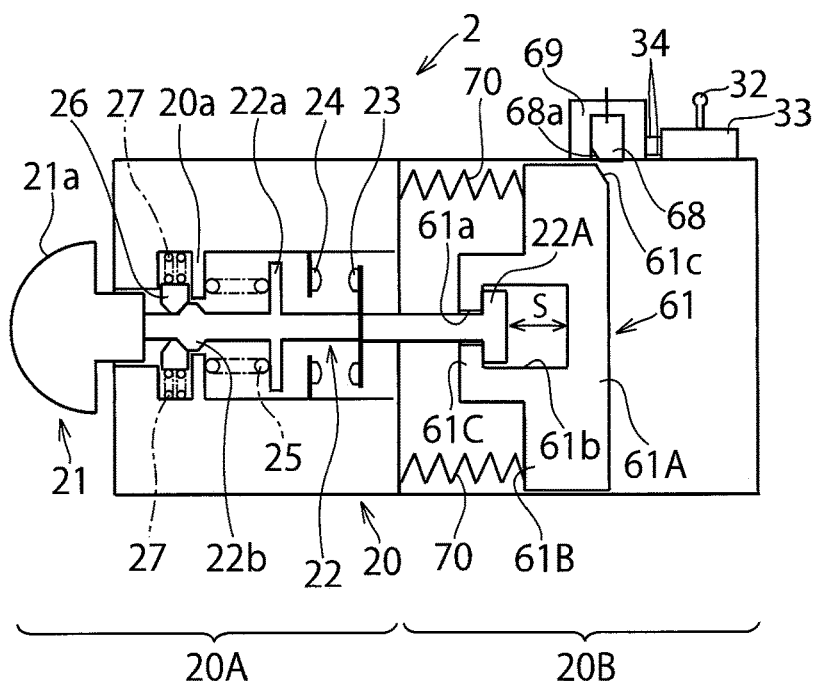
FIG. 18B illustrates an example of an internal structure of the emergency stop switch unit of FIG. 10B showing the state of an alternative operation (or a remote operation) of the emergency stop switch.

FIGS. 13 and 14 show an emergency stop switch unit according to a sixth alternative embodiment of the present invention. FIG. 13 illustrates a state of non-operation of the emergency stop switch unit, and FIG. 14 illustrates a state of alternative operation of the emergency stop switch unit. In the drawings, like reference numbers indicate identical or functionally similar elements to those in the above-mentioned embodiment.

As shown in FIGS. 13 and 14, in this sixth alternative embodiment, the flange part 22a projecting radially outwardly from the axial portion 22 is disposed at the rear (i.e. to the right in the drawings) of the movable contact 23. In the same manner, the projecting part 20a is disposed at the rear of the movable contact 23, but in this sixth embodiment, unlike the first alternative embodiment, the projecting part 20a is provided at a distal end of a stay 20b that extends forwardly (i.e. to the left in the drawings) from the case 20 at a position near the end of the direct operation part 20A. The flange part 22a and the projecting part 20a are disposed opposite to each other. The coil spring 25 is in a compressed state in an axial space between the projecting part 20a and the flange part 22a. An end of the coil spring 25 contacts and engages with the flange part 22a, and the other end of the coil spring 25 contacts the projecting part 20a to engage with the case 20. The coil spring 25 imparts an elastic repulsion (or biasing force) to the projecting part 20a and the flange part 22a. Such an elastic repulsion biases the movable contact 23 away from the fixed contact 24, that is, in a contact-opening direction i.e. to the right side of FIGS. 13 and 14.

The effects of the invention of this sixth alternative embodiment are similar to those of the above-mentioned embodiment. Moreover, in this case, the coil spring is disposed at a position near the distal end of the axial portion 22 thus relatively facilitating maintenance such as a replacement of the coil spring 25, and a spring housing space along an outer perimeter of the coil spring 25 can be attained by the stay 20b thus holding the coil spring 25 stably.

Next, FIGS. 15 to 18B correspond to FIGS. 7 to 10B according to the above-mentioned first to fourth alternative embodiments respectively, which illustrate an example of the internal structure of the emergency stop switch unit 2 shown in the respective alternative embodiments. In FIGS. 15 to 18B, like reference numbers indicate identical or functionally similar elements to those in the above-mentioned embodiment and the first to fourth embodiments.

As shown in FIGS. 15 to 18B, inside the emergency stop switch unit 2, there are provided a movable contact (or first contact) 23 that is fitted at a mid-portion of the axial portion 22 and that moves along with the axial portion 22 and a fixed contact (or second contact) 24 that is fixed to the inside wall surface of the case 20, that is disposed opposite the movable contact 23 and that is adapted to open and close relative to the movable contact 23.

The axial portion 22 has a flange part 22a protruding radially outwardly from a mid-portion of the axial portion 22. One end of a coil spring (or opening biasing means) 25 is in contact and engagement with the flange part 22a. The other end of the coil spring 25 is in contact and engagement with a projecting part 20a that projects radially inwardly from the internal wall surface of the case 20. The coil spring 25 is in a compressed state in an axial space between the projecting part 20a and the flange part 22a such that the coil spring 25 imparts an elastic repulsion (or biasing force) to the projecting part 20a and the flange part 22a. Such an elastic repulsion biases the movable contact 23 away from the fixed contact 24, that is, in a contact-opening direction i.e. to the right side in FIGS. 15, 16, 17 and 18. Therefore, one end of the coil spring 25 moves along with the movement of the axial portion 22.

An axial line of the coil spring 25 coincides with an axial line of the axial portion 22. The elastic repulsion of the coil spring 25 acts in a pressing direction of the emergency stop button 21. Also, at the time of non-operation of the emergency stop switch 2 shown in FIGS. 15, 16, 17 and 18, the coil spring 25 is in a maximum compressive state between the projecting part 20a and the flange part 22a. The elastic repulsion of the coil spring 25 is at a maximum value and the coil spring 25 holds the greatest elastic energy. To the contrary, at the time of operation of the emergency stop switch unit 2 shown in FIGS. 15A, 15B, 16A, 16B, 17A, 17B, 18A and 18B, the coil spring 25 extends axially from the state of FIGS. 15, 16, 17 and 18. The elastic repulsion of the coil spring 25 decreases and thus the elastic energy of the coil spring 25 is also decreased.

The axial portion 22 includes a pair of protruding parts 22b that protrude radially outwardly in the vicinity of the emergency stop button 21. Each of the protruding parts 22b has a trapezoidal shape with a pair of inclined surfaces in a longitudinal cross section. On the other hand, there are provided a pair of engagement members 26 in the case 20. Each of the engagement members 26 has a pair of inclined surfaces that are engageable with the corresponding inclined surfaces of the protruding part 22b. Each of the engagement members 26 is biased toward the corresponding protruding part 22b by an elastic repulsion of a spring 27 disposed in the case 20. At the time of non-operation shown in FIGS. 15, 16, 17 and 18, the left-hand-side inclined surface of the engagement member 26 as shown in the drawings engages with the right-hand-side inclined surface of the protruding part 22b as shown in the drawings, whereas at the time of operation shown in FIGS. 15A, 15B, 16A, 16B, 17A, 17B, 18A and 18B, the right-hand-side inclined surface of the engagement member 26 as shown in the drawings engages with the left-hand-side inclined surface of the protruding part 22b as shown in the drawings.

The structures shown in FIGS. 15 to 18B exhibit the following effects in addition to the effects of the above-mentioned first to fourth alternative embodiments:

The coil spring 25 biases the movable contact 23 to the opening side relative to the fixed contact 24 at all times (i.e. before and after the operation of the emergency stop switch unit 2). Accordingly, especially after operation of the emergency stop switch unit 2, when a malfunction of the emergency stop switch unit 2 occurs such that the movable contact 23 returns to the state in contact with the fixed contact 24, both contacts 23, 24 are biased to open by the action of an elastic repulsion of the coil spring 25 and the both contacts 23, 24 can be maintained in an open state. Therefore, the movable contact 23 and the fixed contact 24 are not caused to be contacted to each other thus securing safety. In such a manner, safety can be further enhanced.

Moreover, since the elastic repulsion of the coil spring 25 is imparted in a press direction of the emergency stop button 21, when the movable contact 23 is caused to forcibly open relative to the fixed contact 24 by a press operation of the emergency stop button 21, the elastic repulsion of the coil spring 25 acts in the same direction as the press direction of the emergency stop button 21. As a result, the movable contact 23 can be caused to open relative to the fixed contact 24 more securely. In addition, the elastic repulsion of the coil spring 25 acts in the moving direction (i.e. a tensile direction of the axial portion 22) of the slider 61, $61_1$, $61_2$ relative to the axial portion 22. Therefore, in the examples of FIGS. 15 to 17B, a load can be released at the time of operating the emergency stop button 21 by the servomotor 6, thereby decreasing an output of the servomotor 6 and reducing a cost. Also, in the examples of FIGS. 18 to 18B, at the time of operating the emergency stop button 21 by the compression coil springs 70, the tensile force relative to the axial portion 22 is assisted thereby causing the movable contact 23 and the fixed contact 24 to be securely transferred into the open state relative to each other.

Furthermore, since the elastic repulsion of the coil spring 25 after operation of the emergency stop button 21 is decreased relative to the elastic repulsion of the coil spring 25 before operation of the emergency stop button 21. Therefore, after operation of the emergency stop button 21, an elastic energy held by the coil spring 25 is decreased and thus the elastic energy of the coil spring 25 after opening of the contact is lower than the elastic energy of the coil spring 25 before opening of the contact. As a result, even in case that the emergency stop switch unit 2 has malfunctioned after operation of the emergency stop button 21, the movable contact 23 and the fixed contact 24 do not return to the state in contact with each other thus further enhancing safety.

Figure 19:
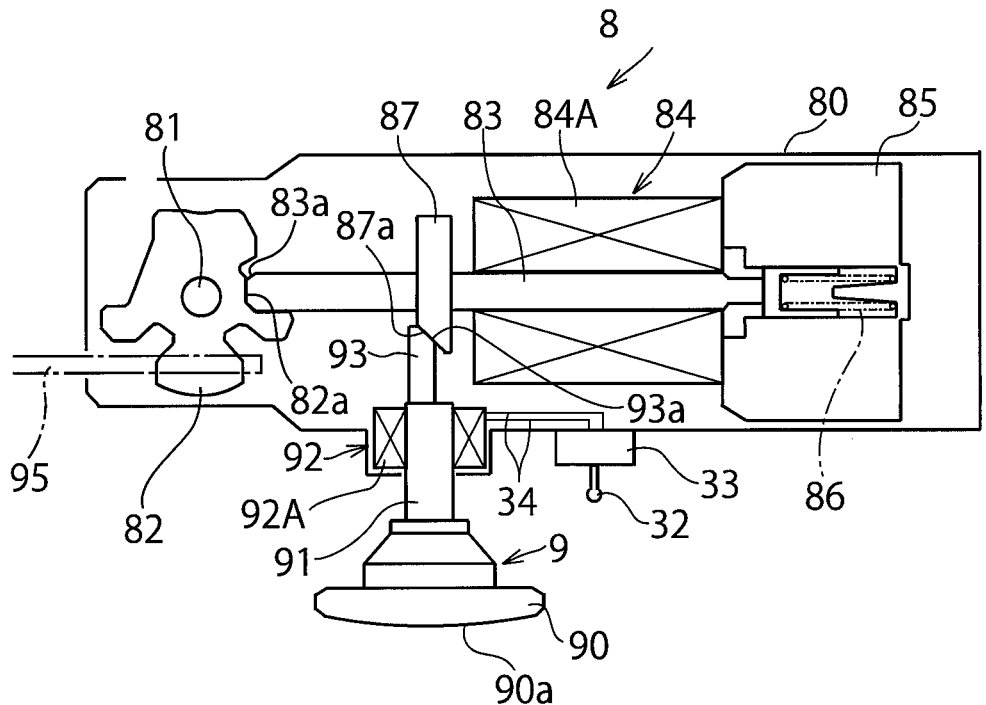
FIG. 19 is a longitudinal sectional view of the safety switch with a lock release button as an operation switch unit according to another alternative embodiment of the present invention illustrating the state of non-operation of the lock release button.
Figure 20:
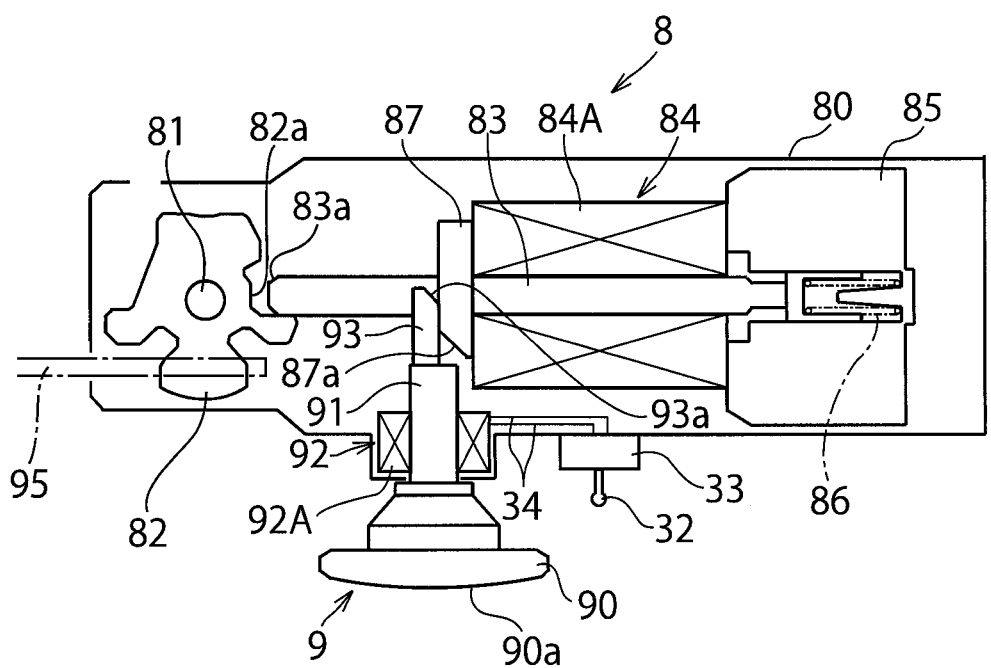
FIG. 20 is a longitudinal sectional view of the safety switch with a lock release button as an operation switch unit according to another alternative embodiment of the present invention illustrating the state of a direct operation (or a manual operation) and an alternative operation (or a remote operation) of the lock release button.
Figure 21:
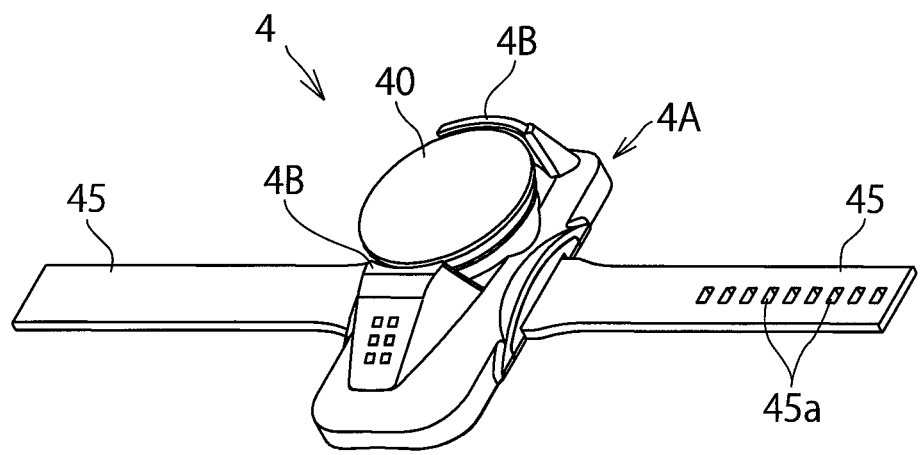
FIG. 21 is a general perspective view of the wireless terminal according to a first embodiment of the present invention constituting the operation system of FIG. 1.
Figure 22:
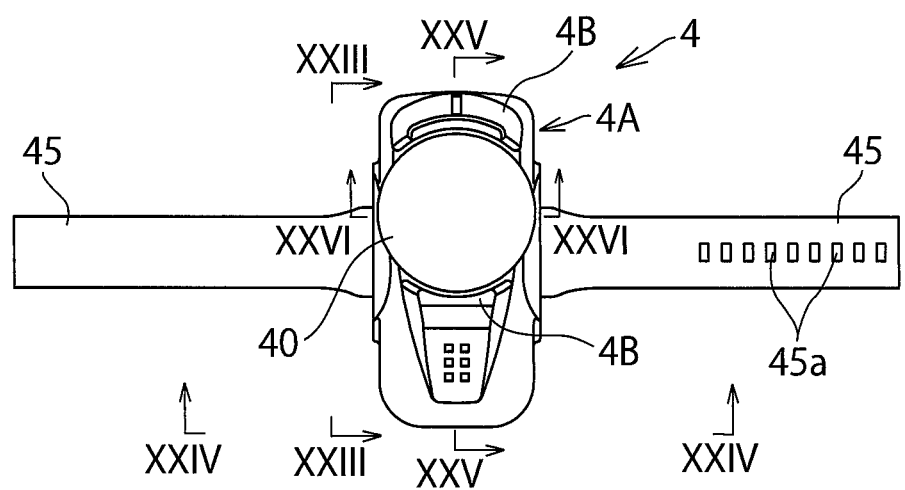
FIG. 22 is a top plan view of the wireless terminal of FIG. 21.
Figure 23:
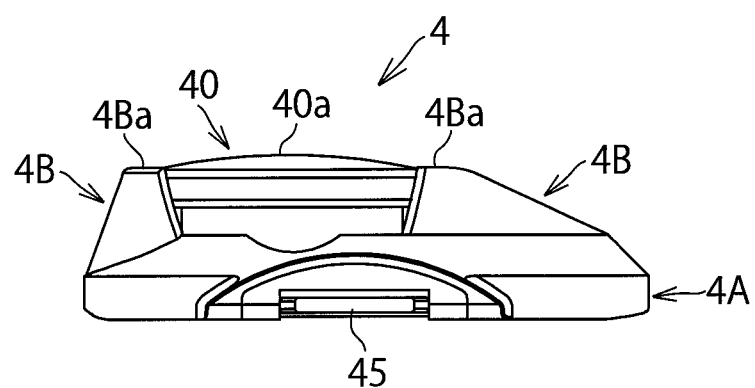
FIG. 23 is a schematic viewed from line XXIII-XXIII of FIG. 22.
Figure 24:
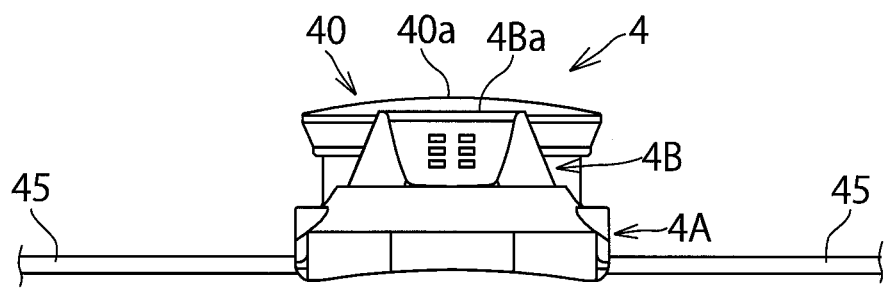
FIG. 24 is a schematic viewed from line XXIV-XXIV of FIG. 22.

Next, FIGS. 19 and 20 illustrate a schematic internal structure of a safety switch employing an unlock button unit (or operation switch unit) for the safety switch having an operation assisting function according to another embodiment of the present invention. In the drawings, like reference numbers indicate identical or functionally similar elements to those in the above-mentioned embodiment. FIGS. 19 and 20 show the state in which a cam is rotated by an insertion of an actuator. FIG. 19 depicts the state at the time of non-operation of the unlock button unit, and FIG. 20 depicts the state at the time of operation (i.e. direct operation and alternative operation) of the unlock button unit. Also, in these drawings, hatching is omitted for illustration purposes.

As shown in FIGS. 19 and 20, the safety switch 8 comprises a case (or housing) 80 installed at a wall or a fixed door at a hazard area, a cam 82 supported rotatably by a shaft 81 on one end side in the case 80, an operation shaft 83 extending longitudinally in the case 80, a solenoid 84 disposed at a longitudinally central position in the case 80, and a contact block 85 disposed on the other end side in the case 80. The operation shaft 83 extending through a solenoid body 84A of the solenoid 84. An end of the operation shaft 83 is adapted to engage with an engagement recess 82a of the cam 82. In FIG. 19, an end of the operation shaft 83 is in engagement with the engagement recess 82a and in FIG. 20, an end of the operation shaft 83 forms a gap relative to the engagement recess 82a. The other end of the operation shaft 83 is inserted into the contact block 85. Inside the contact block 85, a compression spring 86 is provided. An elastic repulsion of the compression spring 86 is imparted to the other end of the operation shaft 83. An actuator 95 provided at a movable door is insertable into an end side of the case 80. The inserted actuator 95 engages with and rotates the cam 82 to move the operation shaft 83. In this way, the operation shaft 83 moves in conjunction with the movement of the cam 82, such that thereby a contact of the contact block 85 is switched. An unlock plate 87 extending radially outwardly is fixed at a central position of the operation shaft 83. The unlock plate 87 has an inclined surface 87a formed at its distal end.

On the other hand, the unlock button unit (or operation switch unit) 9 for the safety switch 8 is provided at the case 80. The unlock button unit 9 extends outwardly from the case 80 at a position opposing the unlock plate 87. The unlock button unit 9 includes a unlock button (or operation switch) 90 having a press surface 90a for a worker to press-operate, an axial portion 91 an end of which is connected to aback surface opposite the press surface 90a of the unlock button 90, that extends toward the inside of the case 80, and that is supported slidably at the case 80, a solenoid (or actuating portion) 92 disposed around the axial portion 91, and an unlock portion 93 connected to the other end of the axial portion 91. The axial portion 91 is inserted into the solenoid body 92A. At a distal end of the unlock portion 93, an inclined surface 93a is formed, which is adapted to come into contact with the inclined surface 87a of the unlock plate 87.

On the outside wall surface of the case 80, there are provided a reception part (or detection portion) 32 to receive a remote signal from a wireless terminal, and a control circuit 33 to control a drive of the solenoid 92 based on the remote signal received (or detected) by the reception part 32. The control circuit 33 is connected to the solenoid 92 through a lead wire 34.

Then, the effects of this embodiment will be explained hereinafter.

In the state of non-operation of the unlock button unit 9 shown in FIG. 19, one end of the operation shaft 83 is in engaged with the engagement recess 82a of the cam 82. At this time, the movable door is closed to be locked, and the contact of the contact block is ON and the apparatus in the hazard area is in operation. Also, at this time, the inclined surface 93a of the unlock portion 93 of the unlock button unit 9 is in contact with the inclined surface 87a of the unlock plate 87 of the operation shaft 83.

When opening the movable door from the state of FIG. 19, by the worker's operation outside the hazard area, a current is supplied to the solenoid 84 to cause the operation shaft 83 to draw into the solenoid body 84A. Then, the contact of the contact block 85 is turned off to stop the apparatus in the hazard area and to unlock the locking state of the movable door. At this juncture, there is formed a gap between the end of the operation shaft 83 and the engagement recess 82a of the cam 82. From this state, when the actuator 95 is moved in a drawing-out direction, a part of the cam 82 that rotates in a clockwise direction comes into contact with the tapered surface 83a at the distal end of the operation shaft 83 to further move the operation shaft 83 longitudinally (i.e. to the right in FIG. 19), thereby further rotating the cam 82, such that thereby the movable door can be opened.

Also, from the state of FIG. 19, when the worker in the hazard area press-operates (i.e. manually operates) the unlock button 90, the axial portion 91 is pressed inwardly along with the unlock button 90. Due to the movement of the axial portion 91, the inclined surface 93a of the unlock portion 93 connected to the distal end of the axial portion 91 presses against and gets over the inclined surface 87a of the unlock plate 87, such that thereby the operation shaft 83 is transferred to the right side in FIG. 20. As a result, the contact of the contact block 85 is turned off to stop an apparatus in the hazard area. At this time, one end of the operation shaft 83 is moved away from the engagement recess 82a of the cam 82 to form a gap between the end of the operation shaft 83 and the engagement recess 82a. From this state, when the actuator 95 is moved in the drawing-out direction, a part of the cam 82 that rotates in the clockwise direction comes into contact with the tapered surface 83a at the distal end of the operation shaft 83 to further move the operation shaft 83 longitudinally (i.e. to the right in FIG. 20), thereby further rotating the cam 82, such that thereby the movable door can be opened.

In this case, at the time of press operation of the unlock button 90, the axial portion 91 is also pressed inwardly. However, at this time, since a current is not supplied to the solenoid body 92A, a sliding resistance during the movement of the axial portion 91 does not occur. As a result, the movement of the axial portion 91 is carried out smoothly (i.e. without a load). Therefore, a press operation of the unlock button 90 by the worker is possible exactly in the same manner as a press operation of a conventional unlock button without a solenoid. In addition, when resetting the unlock button 90 from the state of FIG. 20 to the state of FIG. 19, the worker grasps the unlock button 90 and pulls it (i.e. manually operate it). In the alternative, regarding the resetting operation, by adopting a locking mechanism such as a push-lock and turn-reset mechanism, the locking state held at the time of push-operation of the unlock button 90 may be unlocked by turning the unlock button 90.

Also, in the non-operation state of the unlock button unit 9 shown in FIG. 19, when the wireless terminal transmits an operation signal, the operation signal is received by the reception part 32 of the safety switch 8 and inputted into the control circuit 33. Then, a current is supplied to the solenoid 92 from the control circuit 33. Thereby, as shown in FIG. 20, the axial portion 91 moves toward the inside of the case 80 and thus the unlock portion 93 connected to the distal end of the axial portion 91 also moves inwardly. The inclined surface 93a of the unlock portion 93 presses against and gets over the inclined surface 87a of the unlock plate 87, such that thereby the operation shaft 83 moves to the right in FIG. 20. As a result, the contact of the contact block 85 is turned off and the apparatus in the hazard area is stopped. Also, one end of the operation shaft 83 is moved away from the engagement recess 82a of the cam 82 to form a gap between the end of the operation shaft 83 and the engagement recess 82a. As with the press operation of the unlock button 90, from this state, when the actuator 95 is moved in the drawing-out direction, a part of the cam 82 that rotates in the clockwise direction comes into contact with the tapered surface 83a at the distal end of the operation shaft 83 to further move the operation shaft 83 longitudinally (i.e. to the right in FIG. 20), thereby further rotating the cam 82, such that thereby the movable door can be opened.

At this time, the unlock button 90 is in the pressed state by traveling along with the axial portion 91, such a state being exactly the same as a state of press-operation of the unlock button 90 by the worker. In addition, when resetting the unlock button 90 from the state of FIG. 20 to the state of FIG. 19, after a current supply to the solenoid 92 is stopped, similar to the press operation of the unlock button 90, the worker grasps the unlock button 90 and pulls it (i.e. manually operate it). In the alternative, by adopting a locking mechanism such as a push-lock and turn-reset mechanism, the locking state held at the time of press-operation of the unlock button 90 may be unlocked by turning the unlock button 90.

According to this embodiment, by the worker's manual press-operation (or direct-operation) of the unlock button 90, the unlock button 90 is directly operated. Also, by a current supply to the solenoid 92, the unlock button 90 is alternatively operated through the axial portion 91. Thereby, both the direct operation and the alternative operation of the unlock button 90 can be achieved thus improving operability and safety.

Also, the remote operation of the wireless terminal 4 for the unlock button 90 is detected by the reception part 32 of the safety switch 8 and the unlock button 90 is actuated based on the remote operation, that is, the unlock button 90 is pressed inwardly, such that thereby the unlock button 90 can be operated even at a place away from the unlock button 90 (e.g. outside the hazard area). Accordingly, even in the situation that the worker P cannot press the unlock button 90 directly, he/she can operate the unlock button 90 (i.e. perform an operation support of the unlock button 90) thus further improving an operability and safety. Moreover, according to this embodiment, since the solenoid 92 is disposed on the side opposite to a press side (or manually operation side) of the unlock button 90, that is, at a position other than the press surface 21a, the worker P can perform an operation support of the unlock button 90 without damaging operability at the time of performing a manual operation of the unlock button 90.

Next, the wireless terminal 4 according to a first embodiment of the present invention will be explained hereinafter with reference to FIGS. 21 to 26.

The wireless terminal 4 comprises a button (or operation part) 40 such as a push button operable by a finger or a hand of the worker P, a base 4A supporting the button 40, and a pair of belts (or attaching parts) wrapped around a wrist of the worker P.

Similar to a watch belt, one of the belts 45 of the wireless terminal 4 has a plurality of small through holes 45a formed thereinto and the other of the belts 45 has a buckle (not shown) for inserting into the holes 45a. In the alternative, a hook-and-loop fastener or other engagement means may be used to detachably engage the both belts 45.

The base 4A has a guard portion 4B that extends upwardly (or out of the page of FIG. 22) from a top surface of the base 4A and that is disposed around a part of an outer circumferential surface of the button 40. The guard portion 4B is respectively disposed on the upper and lower sides of the button 40. The guard portion 4B is an arcuate shaped member extending along and apart from the outer circumferential surface of the button 40.

A height position of a top surface 4Ba of each of the guard portions 4B is disposed approximately the same as a height position of a central uppermost surface 40a of the button 40 (see FIGS. 23 to 26). Additionally, in the examples shown in FIGS. 23 to 26, the height position of the top surface 4Ba of each of the guard portions 4B is disposed slightly below the height position of the central uppermost surface 40a of the button 40. In such a manner, the reason why the height position of the top surface 4Ba of each of the guard portions 4B is disposed approximately the same as the height position of the central uppermost surface 40a of the button 40 is that even when the worker P hits the wireless terminal 4 against a table or the like with the wireless terminal 4 attached around his/her wrist, the guard portions 4B can prevent the button 40 from being pressed inwardly by the table or the like, i.e. for a malfunction prevention purpose.

Figure 25:
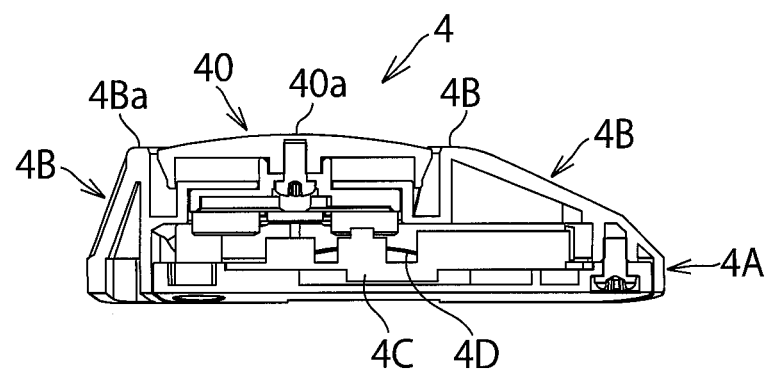
FIG. 25 is a cross sectional view of FIG. 22 taken along line XXV-XXV.
Figure 26:
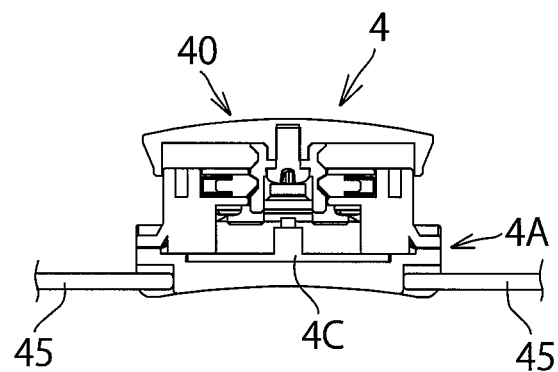
FIG. 26 is a cross sectional view of FIG. 22 taken along line XXVI-XXVI.
Figure 27:
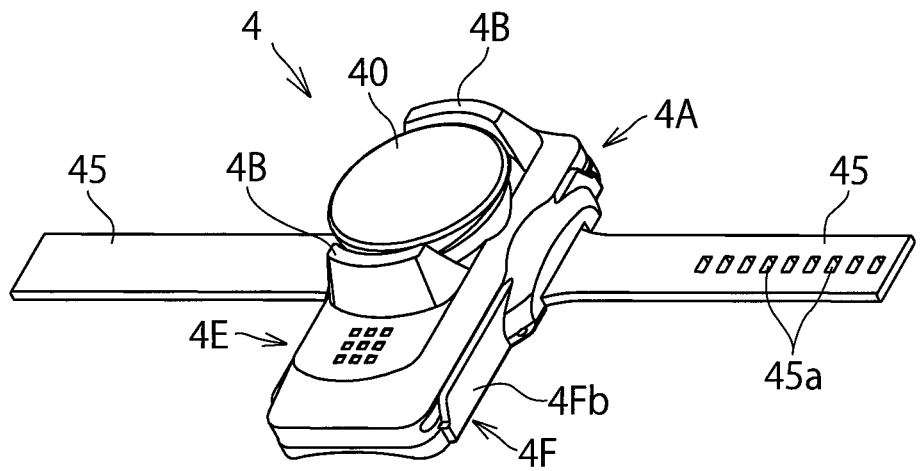
FIG. 27 is a general perspective view of the wireless terminal according to a second embodiment of the present invention constituting the operation system of FIG. 1.
Figure 28:
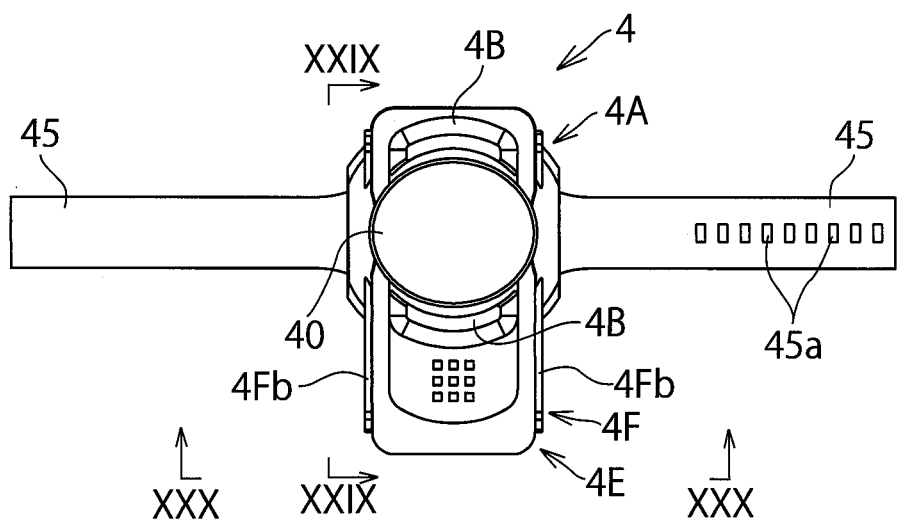
FIG. 28 is a top plan view of the wireless terminal of FIG. 27.
Figure 29:
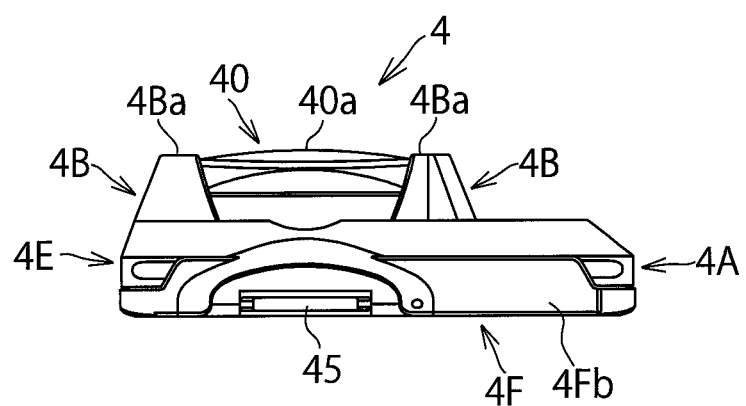
FIG. 29 is a schematic viewed from line XXIX-XXIX of FIG. 27 corresponding to FIG. 23.
Figure 30:
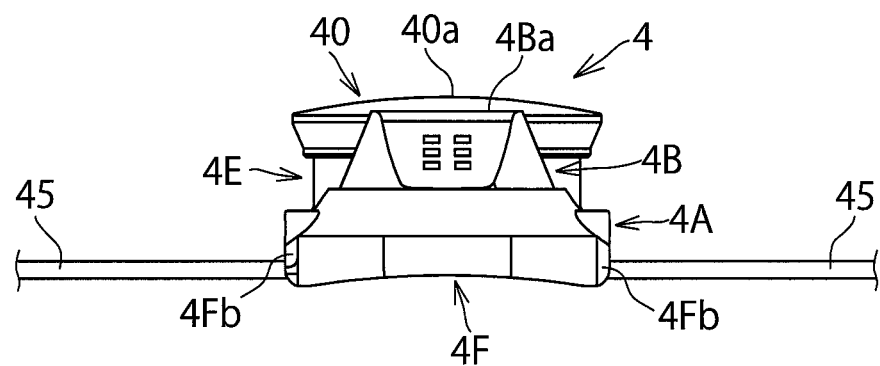
FIG. 30 is a schematic viewed from line XXX-XXX of FIG. 27 corresponding to FIG. 24.

As shown in FIGS. 25 and 26, the wireless terminal 4 has a radio module 4C fitted thereinto. The radio module 4C incorporates a control circuit including a CPU (Central Processing Unit), a transmission/reception part for transmitting/receiving an operation (or stop) signal in order to operate the emergency stop switch unit 2 by a press operation of the button 40, and a display for performing a variety of indications (Details are described hereinafter).

Also, the wireless terminal 4 has a locking mechanism or latching mechanism fitted thereinto that includes a spring 4D (see FIG. 25) and the like to lock the button 40 in the pressed state. Additionally, a reset of the pressed and locked button 40 to the original position may be conducted by the worker's pull of the button 40.

When the worker P performs a press-operation of the button 40 of the wireless terminal 4 during operation of the robot R, the transmission part of the wireless terminal 4 transmits an operation (or stop) signal. The operation signal is received by the reception part 32 (FIG. 4) of the emergency stop switch unit 2 (FIG. 1) of the robot R. Then, the solenoid 3 (FIG. 4) of the emergency stop switch unit 2 is actuated to cause the emergency stop button 21 of the emergency stop switch unit 2 to be pressed, such that thereby the contact is opened. In such a way, the robot R is emergently stopped.

According to this embodiment, the wireless terminal 4 ($4_1$ or $4_2$) does not directly shutdown a power circuit or an electric circuit of the robot R, but emergently stops the robot R in an indirect manner through the emergency stop switch unit 2 by acting on the emergency stop switch unit 2 provided at the robot R to operate the emergency stop switch unit 2. Generally, the emergency stop switch unit is externally fitted to the robot. According to this embodiment, by operating such an emergency stop switch unit, a system for wirelessly operating the robot can be easily structured. Accordingly, in a safety system (or operation system) with an emergency stop switch unit, an installation of the wireless terminal that can operate the emergency stop switch wirelessly can facilitate construction of the safety support system (or operation support system) that can support safety of the safety system.

Also, according to this embodiment, a button operation by the wireless terminal 4 can achieve an effect similar to an effect in a direct operation of the emergency stop switch unit 2 by the worker P. Therefore, even in the case that the worker P is in a place remote from the emergency stop switch unit 2, he/she can emergently stop the robot R.

Moreover, according to this embodiment, communication of the wireless terminal 4 with the emergency stop switch unit 2 is necessary only in the case of operating the wireless terminal 4 and the wireless terminal 4 does not need to communicate with the emergency stop switch unit 2 at all times. Also, bidirection of communication does not need to be secured. Thereby, power consumption can be reduced and cost can be decreased.

In addition, when the worker P press-operates the button 40 of the wireless terminal 4, the button 40 may be locked in a pressed state by the locking mechanism/latching mechanism and the button 40 may be turned on to let the worker P know that the button 40 is pressed.

Then, in restoring the normal driving state from the emergency stop state, the worker P may pull the pressed button 40 of the wireless terminal 4 to return it to the original position and also may pull the emergency stop button 21 of the emergency stop switch unit 2 to return it to the original position.

Also, when the worker P press-operates the button 40 of the wireless terminal 4, the signal transmitted from the transmission part of the wireless terminal 4 is received by the reception part of another wireless terminal 4. Then, the button 40 of another wireless terminal 4 may be turned on and off. Thereby, a holder(s) of other wireless terminals (e.g. one or a plurality of other workers or a supervisor) is informed that any of the wireless terminals has been operated.

Next, the wireless terminal 4 according to a second embodiment of the present invention will be explained hereinafter with reference to FIGS. 27 to 32. In these drawings, like reference numbers indicate identical or functionally similar elements to those in the above-mentioned first embodiment.

This second embodiment differs from the first embodiment in that the belt 45 of the wireless terminal 4 is detachable or removable. FIGS. 27 to 30 show a state that the belt 45 is attached to the wireless terminal 4 and FIGS. 31 and 32 show a state that the belt 45 is removed from the wireless terminal 4.

Figure 31:
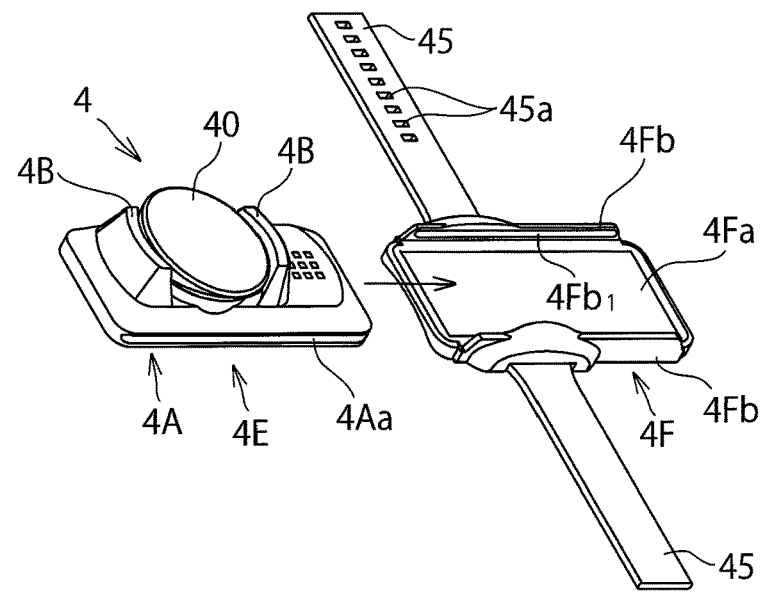
FIG. 31 is a general perspective view illustrating the state that the terminal body of the wireless terminal of FIG. 27 is detachable relative to the wearing part.
Figure 32:
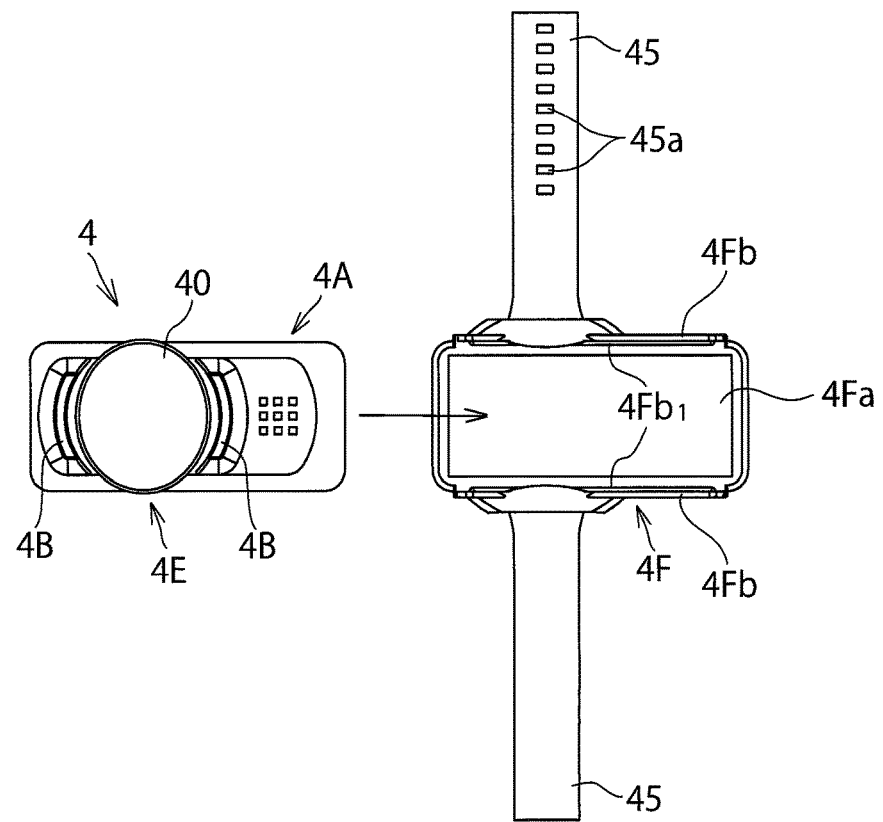
FIG. 32 is a top plan view illustrating the state that the terminal body of the wireless terminal of FIG. 27 is detachable relative to the wearing part.

As shown in FIGS. 31 and 32, the wireless terminal 4 has a terminal body 4E, which comprises a button 40 and a base 4A to hold the button 40. On both side surfaces of the base 4A, a groove 4Aa is respectively formed along the side surfaces. On the other hand, the belt 45 has a case portion 4F that the terminal body 4E is detachably engageable with and that can house the terminal body 4E. The case portion 4F comprises a bottom plate part 4Fa and a pair of side plate portions 4Fb that extend upwardly from both side portions of the bottom plate part 4Fa. Each of the belts 45 extends laterally from each of the side plate portions 4Fb of the case portion 4F. Inside surface of each of the side plate portions 4Fb, there is formed a protrusion part $4Fb_1$ that extends along the inside surface of the side plate portion 4Fb and that is engageable with each of the grooves 4Aa of the base 4A.

When attaching the terminal body 4E to the belt 45, as shown in FIGS. 31 and 32, by moving the terminal body 4E toward the case portion 4F from a front/rear side of the case portion 4F to insert the base 4A of the terminal body 4E into the case portion 4F and to slide the base 4A along the side plate portions 4Fb of the case portion 4F (see an arrow mark in FIG. 31), such that thereby the terminal body 4E is attached to the case portion 4F. At this time, the protrusion parts $4Fb_1$ of the side plate portions 4Fb of the case portion 4F are respectively engaged with the grooves 4Aa of the base 4A of the terminal body 4 (see FIGS. 27 to 30). An attachment of the terminal body 4E to the case portion 4F may be carried out when the belts 45 are wrapped around a wrist of the worker P. Also, removal of the terminal body 4E from the case portion 4F is possible by moving the terminal body 4E away from the case portion 4F, that is, in a direction opposite the arrow-mark direction in FIG. 31.

In this case, since the terminal body 4E of the wireless terminal 4 is detachable relative to the case portion 4F of the belt 45, by adjusting exterior shapes of terminal bodies of wireless terminals of various kinds and specifications to an exterior shape of the terminal body 4E of the wireless terminal 4, communization of the belt 45 becomes possible. Also, due to an easy removal of the terminal body 4E of the wireless terminal 4, as carrying/wearing of the wireless terminal 4 is not limited to a specified worker, the degree of freedom of the wireless terminal 4 in carrying/wearing it is increased. Moreover, the terminal body 4E detached from the case portion 4F can be temporally fitted to a table, a guard fence or the like that is located at a position near the worker P, thus improving flexibility in working. In this case, when the base 4A of the terminal body 4E has a magnet fitted thereto, the terminal body 4E detached from the case portion 4F is easy to be attached and detached relative to a working space, thereby further improving flexibility in working. For example, in addition to the case that workers take turns or a lot of workers are working, in the case that a worker having lost an arm cannot attach a belt and perform a button operation or the like, as the worker can remove the terminal body 4E from the belt 45 and use the terminal body 4E, convenience of the wireless terminal 4 can be improved. Additionally, in the case that a magnet is fitted to the base 4A of the terminal body 4E, an attachment of the terminal body 4E to the case portion 4F may be carried out by using an magnetic force of the magnet.

An action of the system when the worker performs a press operation of the button 40 of the terminal body 4E of the wireless terminal 4 during operation of the robot is similar to that of the above-mentioned first embodiment. That is, the wireless terminal 4 transmits an operation (or stop) signal, which is received by the emergency stop switch unit 2 beside the robot, such that thereby the emergency stop button 21 of the emergency stop switch unit 2 is pressed inwardly to open the contacts thus stopping the robot emergently.

In the above-mentioned first and second embodiments, as the wireless terminal 4, a wrist-watch type (or wrist-band type) was taken as an example that the worker P can attach it around his/her wrist. However, regarding an attaching part of a body of the worker P, it is not limited to the wrist, but a finger (i.e. ring type) or a palm of a hand may be used. Also, a wireless terminal with a built-in acceleration sensor may be used so as to be operated by a flick of a wrist. Moreover, the wireless terminal 4 is not limited to such a portable type (or wearable type). An attachment portion for attaching the wireless terminal 4 to a body of the worker P such as a belt 45 or the like may be omitted (see the wireless terminal body 4E of the above-mentioned second embodiment). In such a case, the wireless terminal 4 may be putted into a pocket of working clothes or fitted to a top portion of a traffic/road cone that is placed at a construction site or the like. Alternatively, the wireless terminal 4 may be a pendant-type operation terminal.

In the example shown in FIG. 6, the wireless terminal 4 was composed of two wireless terminals $4_1$, $4_2$, but an application of the present invention is not limited to such an example. The wireless terminal 4 may be composed of three or more terminals, and alternatively, it may be composed of a single terminal. Also, the wireless terminal may be cooperated with a personal computer, tablet, smartphone or the like. Thereby, various settings and indications become easy.

In the above-mentioned first and second embodiments, RFID (Radio Frequency Identifier) tag may be attached to the wireless terminal 4 ($4_1$, $4_2$). In this case, when the worker P enters an entry-restriction area, it is possible to make settings that an alarm rings.

In the above-mentioned first and second embodiments, biometrics authentication function (e.g. electrocardiogram measurement function or vein pattern reading function, etc.) may be added to the wireless terminal 4 ($4_1$, $4_2$). In this case, it is possible to make settings that the wireless terminal 4 ($4_1$, $4_2$) cannot be operated by any person other than worker himself/herself.

In the above-mentioned first and second embodiments, as a preferred example of the wireless terminal 4, the button 40 was shown that is pressed inwardly in a direction perpendicular to the belt 45, but an application of the present invention is not limited to such an example. Regarding the button 40, various kinds of variants can be adopted.

In the above-mentioned embodiments and alternative embodiments, the wireless terminal 4 as the remote operation portion and the reception part 32 as the detection part were taken as examples, but an application of the present invention is not limited to such examples. The remote operation portion and the detector part may include the following combinations: a combination of optical signal and a photoelectric sensor; a combination of audio signal and a microphone; a combination of video signal and a camera; a combination of an operation instrument such as a lever that operates a linear/rod-like long member such as a wire and a movable member that follows the movement of the distal end of the long member; a combination of a nozzle spouting compressed air and a receiving member that receives compressed air from the nozzle; and a combination of a gun that fires bullets such as BB bullets and a target member that is hit by the bullet fired by the gun, etc.

Other Alternative Embodiment

The above-mentioned embodiments and alternative embodiments should be considered in all respects only as illustrative and not restrictive. Those skilled in the art to which the invention pertains may make modifications and other embodiments employing the principles of this invention without departing from its spirit or essential characteristics particularly upon considering the foregoing teachings.

Other Applicable Example

In the above-mentioned embodiments and alternative embodiments, the collaborative robot was taken as an example as an apparatus that the operation switch unit of the present invention is applied to, but the present invention also has application to industrial robots other than collaborative robots. It is also applicable to not only a single robot but also a plurality of robots. Moreover, the application of the present invention is not limited to a vertically articulated robot but is applicable to other robots such as a SCARA robot and a parallel link robot and also to an AGV (Automated Guided Vehicle). Furthermore, the application of the present invention is not limited to the field of FA (Factory Automation) (i.e. manufacturing industry), but it may be the field of industrial vehicles and construction vehicles including special vehicles such as a power shovel and the like (i.e. construction/civil work industry), restaurant business, food industry, medicine, and distribution industry.

INDUSTRIAL APPLICABILITY

The present invention is of use to an operation switch unit that can improve operability and safety as the operation switch.

DESCRIPTION OF REFERENCE NUMERALS

1: operation system
2: emergency stop switch unit (operation switch unit)
20A: direct operation part
20B: alternative operation part
21: emergency stop button (emergency stop switch/operation switch)
21a: pressure surface (direct operation surface)
22: axial portion (operation axis)
23: movable contact (first contact)
24: fixed contact (fourth contact)
25: coil spring (opening biasing means)]
3: electromagnetic solenoid (actuating portion)
32: reception part (detection part)
4, $4_1$, $4_2$: wireless terminal (remote operation terminal)
40, $40_1$, $40_2$: button (operation part)
$41_1$, $41_2$: transmission part
R: robot (apparatus)
P: worker (operator)

The invention claimed is:

1. An operation switch unit comprising:
a direct operation part that has a manually pushing-operable operation switch and an operation shaft connected to said operation switch, and that is adapted to directly pushing-operate said operation switch manually; and
an alternative operation part that is configured and adapted to be linked with said direct operation part and that alternatively operates said operation switch in place of said direct operation part to pushing-operate said operation switch,
wherein said operation switch is a switch for separating and opening a first contact and a second contact in contact with one another by moving said operation shaft axially by means of a direct pushing-operation of said direct operation part or an alternative operation of said alternative operation part,
wherein at the time of said direct pushing-operation, said operation switch is directly pushing-operated manually to shift to a first pushing-state and said operation shaft moves axially to separate said first contact and said second contact, and
wherein at the time of said alternative operation, said operation switch is alternatively operated and pushing-operated to shift to a second pushing-state identical to said first pushing-state at said direct pushing-operation and said operation shaft moves axially to separate said first contact and said second contact.

2. The operation switch unit according to claim 1, wherein said operation switch is an emergency stop switch and in the state of linkage with said direct operation part said alternative operation part does not impair any requirement that is required for said emergency stop switch.

3. The operation switch unit according to claim 1, wherein said alternative operation part includes a detection part that detects a remote operation of said operation switch and an actuating portion that actuates said operation switch on the basis of said remote operation detected by said detection part.

4. The operation switch unit according to claim 3, wherein said actuating portion is provided at a position that is not a manual operation surface of said operation switch.

5. The operation switch unit according to claim 3, wherein a reset of said operation switch after actuation by said actuating portion is performed by an operator's manual operation of said operation switch.

6. The operation switch unit according to claim 1, wherein said operation switch further comprises an opening biasing means to bias said first contact and said second contact to an opening direction.

7. The operation switch unit according to claim 6, wherein said opening biasing means maintains an opening state of said first contact and said second contact by biasing said first contact and said second contact to said opening direction even in the case of an abnormality where after an operation of said operation switch said first contact and said second contact return to the state of contact.

8. The operation switch unit according to claim 6, wherein a biasing force of said opening biasing means is applied to said actuating portion to actuate said operation switch in an operative direction.

9. The operation switch unit according to claim 6, wherein a biasing force of said opening biasing means is applied to said operation switch in an operative direction.

10. The operation switch unit according to claim 6, wherein a biasing force of said opening biasing means after operation of said operation switch is smaller than a biasing force of said opening biasing means before operation of said operation switch.

11. The operation switch unit according to claim 6, wherein said opening biasing means is formed of a spring that has one end connected to the side of said operation axis and adapted to move along with said operation axis and that has the other end connected to the side of a housing of said operation switch unit.

12. The operation switch unit according to claim 1, wherein said operation switch is an emergency stop switch.

* * * * *